(12) United States Patent
Shigemitsu et al.

(10) Patent No.: US 8,400,718 B2
(45) Date of Patent: Mar. 19, 2013

(54) IMAGE PICKUP LENS AND IMAGE PICKUP MODULE

(75) Inventors: Norimichi Shigemitsu, Osaka (JP); Kenji Hirano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 12/833,313

(22) Filed: Jul. 9, 2010

(65) Prior Publication Data

US 2011/0013290 A1 Jan. 20, 2011

(30) Foreign Application Priority Data

Jul. 14, 2009 (JP) ................................. 2009-165894

(51) Int. Cl.
*G02B 13/18* (2006.01)
*G02B 9/04* (2006.01)

(52) U.S. Cl. ....................... 359/717; 359/793

(58) Field of Classification Search .................. 359/717, 359/793–795
See application file for complete search history.

(56) References Cited

U.S. PATENT DOCUMENTS

| 5,418,356 | A | 5/1995 | Takano |
|---|---|---|---|
| 5,739,965 | A | 4/1998 | Ohno |
| 6,122,009 | A | 9/2000 | Ueda |
| 6,744,570 | B1 | 6/2004 | Isono |
| 7,436,604 | B1 | 10/2008 | Tang |
| RE40,638 | E | 2/2009 | Saito |
| 7,688,523 | B2 | 3/2010 | Sano |
| 7,755,854 | B2 | 7/2010 | Sano |
| 7,764,442 | B2 | 7/2010 | Teraoka |
| 7,852,573 | B2 * | 12/2010 | Teraoka et al. ................ 359/794 |
| 7,957,076 | B2 * | 6/2011 | Tang ............................... 359/717 |
| 2001/0003494 | A1 | 6/2001 | Kitagawa |
| 2003/0048549 | A1 | 3/2003 | Sato |
| 2003/0063396 | A1 | 4/2003 | Saito |
| 2003/0184883 | A1 | 10/2003 | Sato et al. |
| 2003/0197956 | A1 | 10/2003 | Yamakawa |
| 2004/0047274 | A1 | 3/2004 | Amanai |

(Continued)

FOREIGN PATENT DOCUMENTS

| CN | 1892279 A | 1/2007 |
|---|---|---|
| CN | 2890966 Y | 4/2007 |

(Continued)

OTHER PUBLICATIONS

U.S. Appl. No. 13/159,755, filed Jun. 14, 2011, entitled Lens Element, Imaging Lens, and Imaging Module.

(Continued)

*Primary Examiner* — Jordan Schwartz
(74) *Attorney, Agent, or Firm* — Nixon & Vanderhye, P.C.

(57) ABSTRACT

To realize an image pickup lens that can be applied to an image pickup module in which a solid-state image sensing device is used, that allows a reduction in manufacturing cost, and that easily maintains its desired resolving power, etc., the second lens has a surface facing the subject, and the surface includes a central portion sticking out toward the subject and a peripheral portion surrounding the central portion and sinking in toward the image surface. Further, the image pickup lens satisfies the mathematical expression $0.30 < d1/d < 0.45$, where $d1$ is the length of a segment between the center of that surface of the first lens which faces the subject and the center of that surface of the first lens which faces the image surface and d is the whole optical length of the image pickup lens.

11 Claims, 16 Drawing Sheets

U.S. PATENT DOCUMENTS

| | | | |
|---|---|---|---|
| 2004/0105173 A1 | 6/2004 | Yamaguchi | |
| 2004/0160680 A1 | 8/2004 | Shinohara | |
| 2004/0189854 A1 | 9/2004 | Tsukamoto et al. | |
| 2004/0228009 A1 | 11/2004 | Kama | |
| 2005/0002117 A1* | 1/2005 | Ninomiya et al. | 359/719 |
| 2005/0041306 A1 | 2/2005 | Matsuo | |
| 2005/0068640 A1 | 3/2005 | Sato | |
| 2005/0073753 A1* | 4/2005 | Sato | 359/793 |
| 2005/0073754 A1 | 4/2005 | Sato | |
| 2005/0105194 A1 | 5/2005 | Matsui | |
| 2005/0128597 A1 | 6/2005 | Amanai | |
| 2006/0209429 A1 | 9/2006 | Sato et al. | |
| 2006/0238898 A1 | 10/2006 | Shinohara | |
| 2007/0008625 A1 | 1/2007 | Park et al. | |
| 2007/0010122 A1 | 1/2007 | Wang | |
| 2007/0070518 A1 | 3/2007 | Muratani et al. | |
| 2007/0127141 A1 | 6/2007 | Saito | |
| 2007/0127142 A1 | 6/2007 | Saito | |
| 2007/0133108 A1* | 6/2007 | Saito | 359/794 |
| 2008/0043346 A1 | 2/2008 | Sano | |
| 2008/0180816 A1 | 7/2008 | Nakamura | |
| 2008/0239138 A1 | 10/2008 | Sano | |
| 2009/0009889 A1 | 1/2009 | Teraoka | |
| 2009/0015944 A1 | 1/2009 | Taniyama | |
| 2009/0059392 A1 | 3/2009 | Sano | |
| 2009/0086017 A1 | 4/2009 | Miyano | |
| 2009/0257133 A1 | 10/2009 | Sano | |
| 2009/0290234 A1 | 11/2009 | Sano | |
| 2010/0046096 A1 | 2/2010 | Hirao et al. | |
| 2010/0091387 A1 | 4/2010 | Hirao et al. | |
| 2010/0097711 A1 | 4/2010 | Saito | |
| 2010/0103533 A1 | 4/2010 | Taniyama | |
| 2010/0134903 A1 | 6/2010 | Hirao et al. | |
| 2010/0134905 A1 | 6/2010 | Hirao et al. | |
| 2010/0166413 A1 | 7/2010 | Hirao et al. | |
| 2010/0181691 A1 | 7/2010 | Yoshida | |
| 2010/0188555 A1 | 7/2010 | Hirao et al. | |
| 2010/0321794 A1 | 12/2010 | Hirao et al. | |
| 2011/0001865 A1 | 1/2011 | Hirao et al. | |
| 2011/0007195 A1 | 1/2011 | Fukuta | |
| 2011/0013290 A1 | 1/2011 | Shigemitsu et al. | |
| 2011/0032410 A1 | 2/2011 | Shigemitsu et al. | |
| 2011/0061799 A1 | 3/2011 | Wang | |
| 2011/0205641 A1* | 8/2011 | Shih | 359/717 |
| 2011/0255177 A1 | 10/2011 | Suzuki et al. | |
| 2011/0267709 A1 | 11/2011 | Hirao et al. | |
| 2011/0310495 A1 | 12/2011 | You | |

FOREIGN PATENT DOCUMENTS

| | | |
|---|---|---|
| CN | 101266329 A | 9/2008 |
| CN | 201273959 Y | 7/2009 |
| JP | 59-022009 A | 2/1984 |
| JP | 59-022009 A | 2/1984 |
| JP | 61-057918 A | 3/1986 |
| JP | 61-057918 A | 3/1986 |
| JP | 4-191716 A | 7/1992 |
| JP | 7-5358 | 1/1995 |
| JP | 8-334684 | 12/1996 |
| JP | 9-284617 | 10/1997 |
| JP | 10-104491 A | 4/1998 |
| JP | 10-170809 A | 6/1998 |
| JP | 2001-221904 A | 8/2001 |
| JP | 2002-098885 A | 4/2002 |
| JP | 2002-296496 | 10/2002 |
| JP | 2003-029115 A | 1/2003 |
| JP | 2003-057538 A | 2/2003 |
| JP | 2003-270526 A | 9/2003 |
| JP | 2003-329922 A | 11/2003 |
| JP | 2004-4620 | 1/2004 |
| JP | 2004-064460 A | 2/2004 |
| JP | 2004-88713 A | 3/2004 |
| JP | 2004-145183 | 5/2004 |
| JP | 2004-226487 A | 8/2004 |
| JP | 2004-246168 | 9/2004 |
| JP | 2004-246169 | 9/2004 |
| JP | 2004-252067 | 9/2004 |
| JP | 2004-254259 | 9/2004 |
| JP | 2004-301938 A | 10/2004 |
| JP | 2005-018306 | 1/2005 |
| JP | 2005-24581 A | 1/2005 |
| JP | 2005-24889 A | 1/2005 |
| JP | 2005-107254 | 4/2005 |
| JP | 2005-107368 | 4/2005 |
| JP | 2005-107369 | 4/2005 |
| JP | 2005-157154 A | 6/2005 |
| JP | 2005-286536 | 10/2005 |
| JP | 2006-178026 A | 7/2006 |
| JP | 2006-293324 A | 10/2006 |
| JP | 2006-317916 A | 11/2006 |
| JP | 2007-065374 A | 3/2007 |
| JP | 2007-93972 | 4/2007 |
| JP | 2007-155821 A | 6/2007 |
| JP | 2007-156030 A | 6/2007 |
| JP | 2007-156031 A | 6/2007 |
| JP | 2007-212878 A | 8/2007 |
| JP | 2007-293176 A | 11/2007 |
| JP | 2008-33376 A | 2/2008 |
| JP | 2008-46526 A | 2/2008 |
| JP | 2008-76594 A | 4/2008 |
| JP | 2008-107616 A | 5/2008 |
| JP | 2008-185880 A | 8/2008 |
| JP | 2008-242180 A | 10/2008 |
| JP | 2008-281873 A | 11/2008 |
| JP | 2008-309999 | 12/2008 |
| JP | 2009-14899 A | 1/2009 |
| JP | 2009-018578 A | 1/2009 |
| JP | 2009-20182 A | 1/2009 |
| JP | 2009-023353 A | 2/2009 |
| JP | 2009-47836 A | 3/2009 |
| JP | 2009-53592 A | 3/2009 |
| JP | 2009-80413 A | 4/2009 |
| JP | 2009-98492 A | 5/2009 |
| JP | 2009-151113 A | 7/2009 |
| JP | 2009-157402 A | 7/2009 |
| JP | 2009-251515 A | 10/2009 |
| JP | 2009-251516 A | 10/2009 |
| JP | 2009-258286 A | 11/2009 |
| JP | 2009-282223 A | 12/2009 |
| JP | 2010-72032 A | 4/2010 |
| JP | 2010-101942 | 5/2010 |
| JP | 2010-102162 A | 5/2010 |
| JP | 2010-151935 | 7/2010 |
| JP | 2011-107631 A | 6/2011 |
| TW | 200703636 A | 1/2007 |
| WO | 2009/025275 A1 | 2/2009 |
| WO | 2009/116492 A1 | 9/2009 |

OTHER PUBLICATIONS

U.S. Appl. No. 13/053,943, filed Mar. 22, 2011, entitled "Image Sensing Lens and Image Sensing Module".

U.S. Appl. No. 12/899,763, filed Oct. 7, 2010, entitled "Image Pickup Lens, Image Pickup Module, Method for Manufacturing Image Pickup Lens, and Method for Manufacturing Image Pickup Module" (not yet published).

U.S. Appl. No. 12/887,639, filed Sep. 22, 2010, entitled "Image Pickup Lens, Image Pickup Module, Method for Manufacturing Image Pickup Lens, and Method for Manufacturing Image Pickup Module" (not yet published).

U.S. Appl. No. 12/849,257, filed Aug. 3, 2010, entitled "Image Sensing Module, Imaging Lens and Code Reading Method" (not yet published).

U.S. Appl. No. 13/005,877, filed Jan. 13, 2011 entitled "Image Pickup Lens, Image Pickup Module, and Portable Information Device", filed Jan. 13, 2011, inventor Shigemitsu et al. (not yet published).

U.S. Appl. No. 13/432,566, filed Mar. 28, 2012, entitled "Lens Aligning Device and Image Capturing Lens".

Office Action mailed Aug. 8, 2012 in U.S. Appl. No. 13/053,943.

* cited by examiner

FIG. 15

| | Nd | $\nu d$ |
|---|---|---|
| THERMOPLASTIC RESIN | 1.53 | 58 |
| | 1.54 | 56 |
| | 1.509 | 56 |
| | 1.525 | 56 |
| | 1.531 | 56 |
| | 1.607 | 27 |
| | 1.632 | 23 |
| | 1.6142 | 26 |
| | 1.586 | 34 |
| | 1.515 | 57 |
| | 1.584 | 30.49 |
| THERMOSETTING RESIN | 1.498 | 46 |
| | 1.502 | 47 |
| | 1.508 | 42 |
| | 1.457 | 48 |
| | 1.49 | 39 |
| | 1.503 | 53 |

IMAGE PICKUP LENS AND IMAGE PICKUP MODULE

This Nonprovisional application claims priority under 35 U.S.C. §119(a) on Patent Application No. 2009-165894 filed in Japan on Jul. 14, 2009, the entire contents of which are hereby incorporated by reference.

TECHNICAL FIELD AND SUMMARY

The technology presented herein relates to: image pickup lenses and modules that are to be mounted into digital cameras, etc. of portable terminals; methods for manufacturing image pickup lenses; and methods for manufacturing image pickup modules. In particular, the present invention relates to: an image pickup module in which a solid-state image sensing device is used; an image pickup lens well-suited for application to such an image pickup module; a method for manufacturing such an image pickup module; and a method for manufacturing such an image pickup lens.

BACKGROUND ART

In recent years, various types of image pickup module in which solid-state image sensing devices are used as image pickup devices have been developed to be mounted into digital cameras, digital video units, etc. Examples of solid-state image sensing devices here encompass solid-state image sensing devices each constituted by a CCD (charge-coupled device) and a CMOS (complementary metal-oxide semiconductor), etc. Use of such solid-state image sensing devices makes it possible to constitute image pickup modules that are small in size and low in height.

In particular, portable terminals such as portable information terminals and portable phones have spread rapidly in recent years. Image pickup modules that are mounted into such portable terminals are required to include image pickup lenses that are high in resolving power, small in size, and low in height.

As an example of an image pickup lens that is high in resolving power, small in size, and low in height, Patent Literature 1 discloses an image pickup lens (so-called telescopic image pickup lens) constituted by using two lenses, namely a first lens having a positive refracting power and a second lens having a negative refracting power.

Because the whole length of the image pickup lens disclosed in Patent Literature 1 is shorter than the focal length of the image pickup lens as a whole, the image pickup lens can be small in size and low in height. Further, because the first and second lenses of the image pickup lens disclosed in Patent Literature 1 combine to correct various aberrations such as coma aberrations, astigmatism, and field curvatures, the image pickup lens can be high in resolving power. Therefore, the technique disclosed in Patent Literature 1 makes it possible to realize a small-size image pickup lens satisfactory in optical characteristic.

Further, as another example of an image pickup lens that is high in resolving power, small in size, and low in height, Patent Literature 2 discloses an image pickup lens constituted by using two lenses, namely a first lens having a positive refracting power and a second lens having a positive or negative refracting power.

As other examples of image pickup lenses that are high in resolving power, small in size, and low in height, there are image pickup lenses each constituted by using two lenses, namely a first lens having a positive refracting power and a second lens having a positive refracting power (see Patent Literatures 4 to 7 and 9 to 11).

It should be noted that Patent Literature 3 discloses a wide-angle lens for camera which maintains a high resolving power and which can be easily manufactured.

The lens disclosed in Patent Literature 3 is constituted by using two lenses, namely a first lens having a positive or negative refracting power and a second lens having a positive refracting power. Furthermore, the lens disclosed in Patent Literature 3 is intended to have spherical aberrations and field curvatures remedied by curving a film constituting an image surface.

Each of the techniques disclosed in Patent Literatures 1 to 11 realizes a small-size, low-height image pickup lens by shaping each of its first and second lenses so that each of those surfaces of the lens which face an object and the image surface, respectively, includes a concave surface and/or a convex surface.

CITATION LIST

Patent Literature 1
Japanese Patent Application Publication, Tokukai, No. 2008-309999 A (Publication Date: Dec. 25, 2008)
Patent Literature 2
Japanese Patent Application Publication, Tokukai, No. 2004-145183 A (Publication Date: May 20, 2004)
Patent Literature 3
Japanese Patent Application Publication, Tokukaihei, No. 8-334684 A (Publication Date: Dec. 17, 1996)
Patent Literature 4
Japanese Patent Application Publication, Tokukai, No. 2002-296496 A (Publication Date: Oct. 9, 2002)
Patent Literature 5
Japanese Patent No. 3717482 (Japanese Patent Application Publication, Tokukai, No. 2004-246168 A (Publication Date: Sep. 2, 2004)
Patent Literature 6
Japanese Patent No. 4074203 (Japanese Patent Application Publication, Tokukai, No. 2004-246169 A (Publication Date: Sep. 2, 2004)
Patent Literature 7
Japanese Patent No. 3717483 (Japanese Patent Application Publication, Tokukai, No. 2004-252067 A (Publication Date: Sep. 9, 2004)
Patent Literature 8
Japanese Patent No. 3717487 (Japanese Patent Application Publication, Tokukai, No. 2004-4620 A (Publication Date: Jan. 8, 2004)
Patent Literature 9
Japanese Patent Application Publication, Tokukai, No. 2005-107254 A (Publication Date: Apr. 21, 2005)
Patent Literature 10
Japanese Patent Application Publication, Tokukai, No. 2005-107368 A (Publication Date: Apr. 21, 2005)
Patent Literature 11
Japanese Patent Application Publication, Tokukai, No. 2005-107369 A (Publication Date: Apr. 21, 2005)

The manufacture of image pickup lenses each constituted by using a plurality of lenses becomes difficult as such image pickup lenses become smaller in size and lower in height.

That is, a small-size, low-height optical system constituted by lenses is required to have very rigorous manufacturing tolerance for variations in the thickness of the lenses and eccentricity. The term "eccentricity" here means various shifts in position that entail displacements of the optical axis of an optical system along a line normal to the optical axis of the optical system, such as shifts in position of the optical axis between both surfaces of each lens constituting the optical system and shifts in position of one lens in relation to another.

In order to be applied to an image pickup module in which a solid-state image sensing device is used, a small-size, low-height image pickup lens constituted by lenses is required to keep errors, such as the variations in the thickness of the lenses and eccentricity, within a range of approximately 1.5 to 2 μm. Because of the necessity to satisfy this strong demand, the manufacture becomes difficult. When the manufacture becomes difficult, the image pickup lens suffers from such problems, e.g., that an increase in manufacturing cost is required for the imposed demand to be satisfied, and that an increase in the frequency of variations in the manufacture makes it difficult to maintain the desired resolving power.

The image pickup lenses disclosed in Patent Literatures 1, 2, and 4 to 11 are no exceptions to the difficulty of manufacture. Therefore, the image pickup lenses disclosed in Patent Literatures 1, 2, and 4 to 11 suffer from such problems, e.g., that an increase in manufacturing cost is required for the imposed demand to be satisfied, and that an increase in the frequency of large variations in the manufacture makes it difficult to maintain the desired resolving power.

In general, the smaller in size and lower in height an image pickup lens becomes, the more significantly it changes in MTF (modulation transfer function) according to the amount of eccentricity. Therefore, an image pickup lens that are smaller in size and lower in height is required to be manufactured so that the eccentricity is closer to 0 μm. As a result, the degree of difficulty of manufacture becomes higher.

The lens disclosed in Patent Literature 3, which maintains a high resolving power and which can be easily manufactured, is configured such that the film constituting the image surface is curved, and therefore suffers from such a problem that it is difficult to apply the lens to an image pickup module in which a CCD or CMOS image sensor is used, i.e., to an image pickup module in which a solid-state image sensing device is used.

The present technology, which has been made in view of the foregoing problems, has as an object to provide: an image pickup lens that can be applied to an image pickup module in which a solid-state image sensing device is used, that allows a reduction in manufacturing cost, and that easily maintains its desired resolving power; an image pickup module including such an image pickup lens; a method for manufacturing such an image pickup lens; and a method for manufacturing such an image pickup module.

In order to solve the foregoing problems, an image pickup lens according to the example embodiments presented herein includes: an aperture stop; a first lens; and a second lens, the aperture stop, the first lens, and the second lens being sequentially arranged along a direction from a subject to an image surface, the first lens having a convex surface facing the subject, the second lens having a surface facing the subject, the surface including a central portion sticking out toward the subject and a peripheral portion surrounding the central portion and sinking in toward the image surface, the image pickup lens satisfying mathematical expression (1):

$$0.30 < d1/d < 0.45 \qquad (1),$$

where d1 is the length of a segment between the center of that surface of the first lens which faces the subject and the center of that surface of the first lens which faces the image surface and d is the whole optical length of the image pickup lens, the whole optical length d of the image pickup lens being a direct distance along an optical axis of the image pickup lens between that portion of a place (A) or (B) which is closest to the subject and the image surface, (A) indicating a place in the aperture stop that is made larger or smaller to let more or less light in, (B) indicating a place in the first lens where light enters.

According to the foregoing configuration, the second lens is configured to have a surface facing the subject, and the surface includes a central portion sticking out toward the subject and a peripheral portion surrounding the central portion and sinking in toward the image surface. According to this configuration, a ray of light that passes through the second lens near the central portion becomes capable of forming an image in a place closer to the subject along the direction from the subject to the image surface (or, in general, along the optical axis of the image pickup lens), and a ray of light that passes through the second lens near the peripheral portion becomes capable of forming an image in a place closer to the image surface along the same direction. For this reason, the present image pickup lens can correct various aberrations such as field curvatures in accordance with the degree to which the second lens sticks out toward the subject and the degree to which the second lens sinks in toward the image surface. Further, according to this configuration, the second lens becomes able to be used as a lens having a positive or negative refracting power as the first lens does. This makes it possible to reduce asymmetry between the first lens and the second lens. As a result, the present image pickup lens can decrease adverse effects of errors, if any, such as eccentricity and variations in the thickness of the first and second lenses, respectively. Therefore, the permissible scope of such errors can be broadened substantially.

Furthermore, by satisfying mathematical expression (1), the present image pickup lens allows modestly changes in the shapes of those surfaces of the first lens which face the subject and the image surface, respectively. That is, the degree to which these surfaces stick out or sink in along the direction from the subject to the image surface can be made smaller. Furthermore, the distance between these surfaces along the same direction can be broadened. Having satisfied mathematical expression (1), the present image pickup lens can decrease adverse effects of errors, if any, such as eccentricity and variations in the thickness of the first and second lenses, respectively. Therefore, the permissible scope of such errors can be broadened substantially.

Thus, even when the present image pickup lens is made smaller in size and lower in height, there is no longer a strong demand imposed on the present image pickup lens to deal with eccentricity, variations in the thickness of the first and second lenses, respectively, etc. This makes it comparatively easy to manufacture an image pickup lens that satisfies the imposed demand. For this reason, the present image pickup lens allows a reduction in manufacturing cost required to satisfy the imposed demand, and easily maintains its desired resolving power because of a reduction in the frequency of variations in the manufacture.

When d1/d is less than or equal to 0.30, the first lens becomes thinner; therefore, the shape of that surface of the first lens which faces the subject is changed greatly for a greater refracting power. That is, it is undesirably necessary to increase the degree to which the convex surface sticks out. When d1/d is greater than or equal to 0.45, that surface of the first lens which faces the subject becomes too close to the image surface, whereby it undesirably becomes difficult to correct various aberrations such as field curvatures. Therefore, in order to achieve its effects, the present image pickup lens needs to have a value of d1/d that satisfies mathematical expression (1).

Furthermore, such a configuration of the present image pickup lens as to maintain a high resolving power and to be easily manufactured can be realized simply by devising a configuration of the first and second lenses and fixing a distance between each of the lenses and the image surface. As such, the present image pickup lens can be applied to an image pickup module in which a solid-state image sensing device is used.

In order to solve the foregoing problems, an image pickup lens according to the example embodiments presented herein includes: an aperture stop; a first lens; and a second lens, the aperture stop, the first lens, and the second lens being sequentially arranged along a direction from a subject to an image surface, the first lens having a convex surface facing the subject, the second lens having a surface facing the subject, the surface including a central portion sticking out toward the subject and a peripheral portion surrounding the central portion and sinking in toward the image surface, the image pickup lens satisfying mathematical expression (2):

$$0.10 < d2/d < 0.23 \quad (2),$$

where d2 is the length of a segment between the center of that surface of the second lens which faces the subject and the center of that surface of the second lens which faces the image surface and d is the whole optical length of the image pickup lens.

According to the foregoing configuration, by satisfying mathematical expression (2), the present image pickup lens allows those surfaces of the second lens which face the subject and the image surface, respectively, to be placed close to the image surface, and therefore can correct various aberrations such as field curvatures. In addition to the effect of broadening the permissible scope of errors as brought about by the second lens configured to have a peripheral portion sinking in toward the image surface, the present image pickup lens can be comparatively easily manufactured.

Thus, as in the case where mathematical expression (1) is satisfied, the present image pickup lens can be applied to an image pickup module in which a solid-state image sensing device is used, allows a reduction in manufacturing cost, and easily maintains its desired resolving power.

When d2/d is less than or equal to 0.10, a difference in power distribution between the central portion of the second lens and the peripheral portion of the second lens (e.g., a difference between the positive power of the second lens in the central portion and the negative power of the second lens in the peripheral portion) becomes smaller, whereby it undesirably becomes difficult to correct various aberrations such as field curvatures. When d2/d is greater than or equal to 0.23, those surfaces of the second lens which face the subject and the image surface, respectively, become remote from the image surface. In this case, it undesirably becomes difficult to correct various aberrations such as field curvatures. Therefore, in order to achieve its effects, the present image pickup lens needs to have a value of d2/d that satisfies mathematical expression (2).

In order to solve the foregoing problems, an image pickup lens according to the present invention includes: an aperture stop; a first lens; and a second lens, the aperture stop, the first lens, and the second lens being sequentially arranged along a direction from a subject to an image surface, the first lens having a convex surface facing the subject, the second lens having a surface facing the subject, the surface including a central portion sticking out toward the subject and a peripheral portion surrounding the central portion and sinking in toward the image surface, the image pickup lens satisfying mathematical expression (3):

$$0.20 < d3/d < 0.35 \quad (3),$$

where d3 is the length in air of a segment connecting (i) a point of intersection between that surface of the second lens which faces the image surface and an optical axis of the image pickup lens with (ii) that portion of the image surface which is closest to the point of intersection and d is the whole optical length of the image pickup lens. The term "length in air" means a length obtained by dividing the geometric length of a medium by the refractive index of the medium.

According to the foregoing configuration, by satisfying mathematical expression (3), the present image pickup lens allows that surface of the second lens which faces the image surface to be placed close to the image surface, and therefore can correct various aberrations such as distortions. In addition to the effect of broadening the permissible scope of errors as brought about by the second lens configured to have a peripheral portion sinking in toward the image surface, the present image pickup lens can be comparatively easily manufactured.

Thus, as in the case where mathematical expression (1) or (2) is satisfied, the present image pickup lens can be applied to an image pickup module in which a solid-state image sensing device is used, allows a reduction in manufacturing cost, and easily maintains its desired resolving power.

When d3/d is less than or equal to 0.20, that surface of the second lens which faces the image surface physically interferes with the image surface. Furthermore, when a member for protecting the image surface (e.g., cover glass) is provided, that surface of the second lens which faces the image surface physically interferes with this member. Thus, when d3/d is less than or equal to 0.20, it is virtually impossible to further satisfy mathematical expression (1). This undesirably leaves no other choice but to lessen the effect of broadening the permissible scope of errors. When the d3/d is greater than or equal to 0.35, the second lens becomes remote from the image surface. This undesirably makes it difficult to satisfactorily correct aberrations such as field curvatures and distortions. Therefore, in order to achieve its effects, the present image pickup lens needs to have a value of d3/d that satisfies mathematical expression (3).

Further, an image pickup module according to the present embodiment includes: a sensor constituted by using a solid-state image sensing device; and an image pickup lens as set forth in any one of the configurations above. The present image pickup module brings about the same effects as the image pickup lens that it includes.

Furthermore, the image pickup module has various aberrations sufficiently corrected by the effects of the image pickup lens that it includes. Further, the image pickup lens of the image pickup module has a substantially broad permissible scope of errors such as eccentricity and variations in the thickness of the first lens and the second lens, respectively. For this reason, even if the image pickup module does not include an adjustment mechanism for adjusting the distance between the image pickup lens and the image surface or a body tube, the adverse effects on the maintenance of resolving power are small. The omission of the adjustment mechanism and the body tube allows the image pickup module to be smaller in size, lower in height, and lower in cost.

Further, a method according to the present embodiment for manufacturing an image pickup lens as set forth in any one of the configurations above includes the steps of: molding a resin into a plurality of such first lenses integrally to produce an array of first lenses; molding another resin into a plurality of such second lenses integrally to produce an array of second lenses; joining the array of first lenses and the array of second lenses so that each of the first lenses has its optical axis on a same straight line as an optical axis of its corresponding second lens; and cutting the array of first lens and the array of second lenses thus joined into each separate image pickup lens.

Further, a method according to the present embodiment for manufacturing an image pickup module as set forth in any one of the configurations above includes the steps of: molding a resin into a plurality of such first lenses integrally to produce an array of first lenses; molding another resin into a plurality of such second lenses integrally to produce an array of second lenses; joining the array of first lenses and the array of second lenses so that each of the first lenses has its optical axis on a same straight line as an optical axis of its corresponding second lens; and cutting the array of first lens and the array of second lenses thus joined into each separate image pickup module.

The foregoing configuration makes it possible to batch-manufacture a large number of image pickup lenses or modules by molding separate resins into a plurality of first lenses and a plurality of second lenses integrally, respectively, joining them, and then cutting them into each separate image pickup lens or module. Therefore, the present method allows a reduction in cost, in particular, of mass-production of image pickup lenses or modules according to the present embodiment.

As described above, an image pickup lens according to the present embodiment includes: an aperture stop; a first lens; and a second lens, the aperture stop, the first lens, and the second lens being sequentially arranged along a direction from a subject to an image surface, the first lens having a convex surface facing the subject, the second lens having a surface facing the subject, the surface including a central portion sticking out toward the subject and a peripheral portion surrounding the central portion and sinking in toward the image surface, the image pickup lens satisfying at least one of mathematical expressions (1) to (3).

This brings about the effects of being able to be applied to an image pickup module in which a solid-state image sensing device is used, of allowing a reduction in manufacturing cost, and of easily maintaining the desired resolving power.

BRIEF DESCRIPTION OF DRAWINGS

FIG. 15 is a table showing the relationships between the refractive index and Abbe number of an image pickup lens as a whole on d-rays for thermoplastic resin and thermosetting resin.

DESCRIPTION OF EMBODIMENTS

[Image Pickup Lens]

Figure 1:
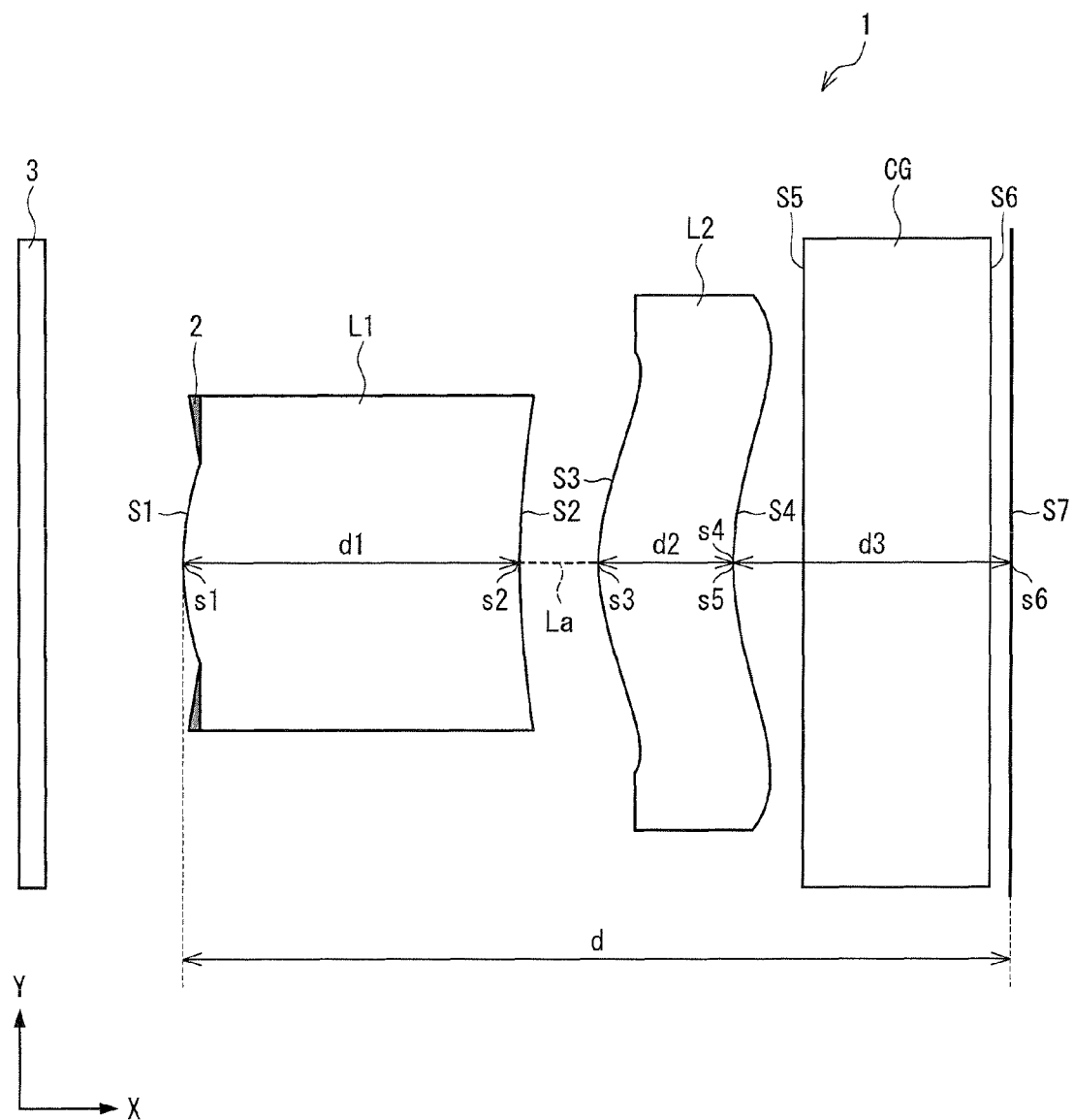
FIG. 1 is a cross-sectional view showing the configuration of an image pickup lens according to an embodiment.

FIG. 1 is a cross-sectional view the configuration of an image pickup lens 1 according to an embodiment.

FIG. 1 shows a cross-section of the image pickup lens 1 along an X direction (horizontal direction on the drawing) and a Y direction (vertical direction on the drawing). The X direction represents a direction from a subject (object) 3 to an image surface S7. Ideally, the optical axis La of the image pickup lens 1 has its optical axis La extending along the X direction. The Y direction represents a direction perpendicular to the X direction. Ideally, a line normal to the optical axis La of the image pickup lens 1 extends along the Y direction. Furthermore, the direction from the subject 3 to the image surface S7 specifically means the drawing direction of a segment between the subject 3 and the image surface S7.

The subject 3 is an object whose image is taken by the image pickup lens 1. The image surface S7 is a surface to which the optical axis La of the image pickup lens 1 is perpendicular and on which an image is formed. A real image can be observed on a screen (not shown) placed on the image surface S7.

The image pickup lens 1 of FIG. 1 includes an aperture stop 2, a first lens L1, a second lens L2, and a cover glass (protective member) CG.

The aperture stop 2, the first lens L1, the second lens L2, and the cover glass CG are sequentially arranged in the order named along the direction from the subject 3 to the image surface S7. That is, the aperture stop 2, the first lens L1, the second lens L2, and the cover glass CG are sequentially arranged along the X direction.

Specifically, the aperture stop 2, provided on that surface (object-facing surface) S1 of the first lens L1 which faces the subject 3, covers substantially the whole area of the surface S1, excluding a central portion including the center s1 of the surface S1 and an area around the center s1. The aperture stop 2 serves to limit the diameter of a bundle of rays on the axis of light incident upon the image pickup lens 1 so that the incident light can properly pass through the first lens L1 and the second lens L2.

The first lens L1 has the surface S1, which includes a convex surface (sticks out), and a surface S2 including a concave surface. As mentioned above, the surface S1 faces the subject 3, and substantially the whole area of the surface S1, excluding the convex surface provided as a central portion including the center s1 of the surface S1 and an area around the center s1, is covered by the aperture stop 2. The surface (image-facing surface) S2 faces in substantially the opposite direction to the surface S1, and faces the image surface S7. The first lens L1 can be realized, for example, by a well-known meniscus lens whose convex surface faces the subject 3. It is preferable that the first lens L1 have a positive refracting power, but the first lens L1 may have a negative refracting power. The distance d1 between the centers of the surfaces of the first lens L1 means the length of a segment between the center s1 of the surface S1 and the center s2 of the surface S2. Furthermore, the optical axis La of the image pickup lens 1 is in line with the segment between the center s1 of the surface S1 and the center s2 of the surface S2.

The term "convex surface of a lens" means a place in the lens where its spherical surface is curved outward. The term "concave surface of a lens" means a place in the lens that constitutes a hollow, i.e., an inwardly-curved portion of the lens.

Strictly speaking, the aperture stop 2 is formed so that the convex surface formed as part of the surface S1 of the first lens L1 sticks out from the aperture stop 2 toward the subject 3. However, there are no particular limits on whether or not the convex surface sticks out from the aperture stop 2 toward the subject 3. It is sufficient for the aperture stop 2 to be placed closer to the subject 3 than the first lens L1 is.

The second lens L2 has a surface (object-facing surface) S3 facing the subject 3 and a surface (image-facing surface) S4 facing the image surface S7. The surface S3 of the second lens L2 includes a convex surface that extends over a central portion including the center s3 of the surface S3 and an area around the center s3 (sticks out toward the subject 3), and includes a concave surface that extends along that peripheral portion of the surface S3 which is farther from the center s3 than the central portion is (sinks in toward the image surface S7). In the image pickup lens 1 of FIG. 1, the surface S4 conforms to the shape of the surface S3 by including a concave surface that extends over a central portion including the center s4 of the surface S4 and an area around the center s4, and by including a convex surface that extends along that peripheral portion of the surface S4 which is farther from the center s4 than the central portion is. However, the shape of the surface S4 is not limited to such a shape. It is preferable that the second lens L2 have a positive refracting power, but the second lens L2 may have a negative refracting power. The distance d2 between the centers of the surfaces of the second lens L2 means the length of a segment between the center s3 of the surface S3 and the center s4 of the surface S4. Furthermore, the optical axis La of the image pickup lens 1 is in line with the segment between the center s3 of the surface S3 and the center s4 of the surface S4.

It can be understood from this configuration that the surface S3 of the second lens L2 is configured to have an inflection point.

When the first lens L1 and the second lens L2 are plastic lenses that can be manufactured by injection molding, it is possible to mass-produce lenses that are small in curvature radius and outside diameter; and because it is easy to aspherize such lenses, they are advantageous from the viewpoint of aberration corrections. However, the first lens L1 and the second lens L2 are not limited to plastic lenses, but may be glass lenses, etc.

Figure 6:
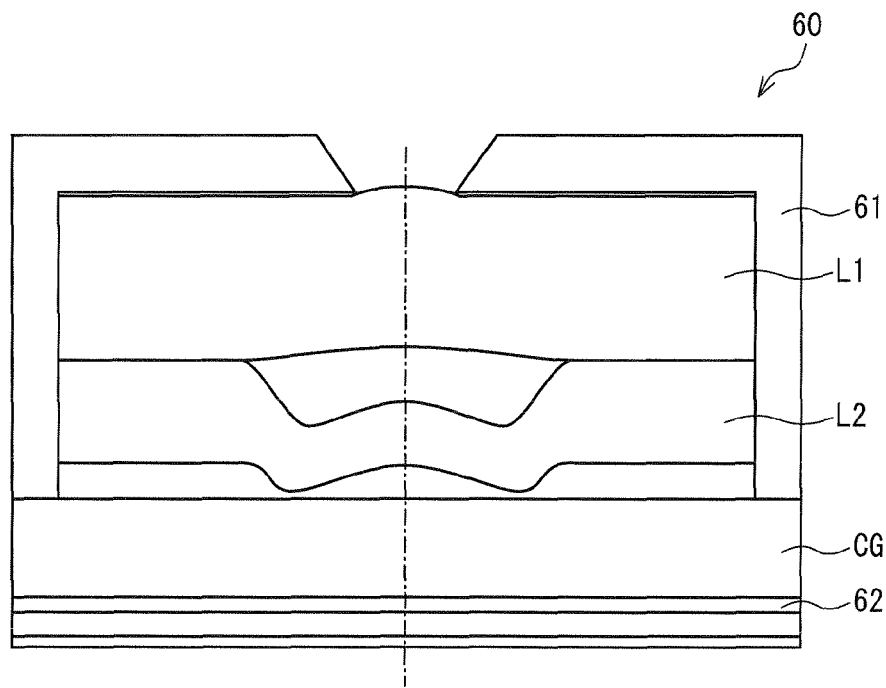
FIG. 6 is a cross-sectional view showing the configuration of an image pickup module according to still another embodiment.
Figure 7:
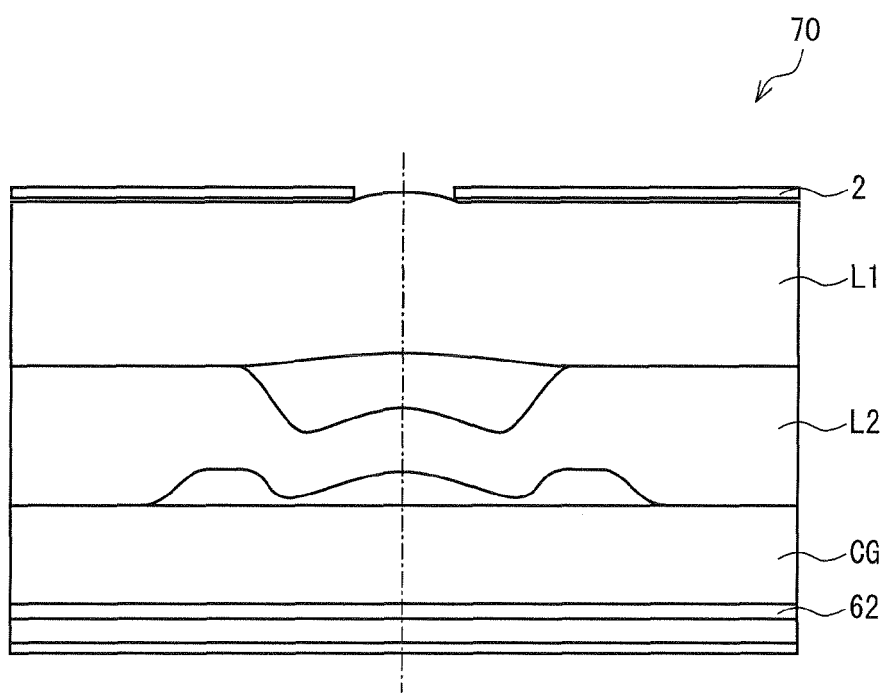
FIG. 7 is a cross-sectional view showing the configuration of an image pickup module according to the other embodiment.

The cover glass CG is interposed between the second lens L2 and a sensor 62 (see FIGS. 6 and 7). The cover glass CG covers the sensor 62 to protect the sensor 62 from physical damage, etc. The cover glass CG has a surface (object-facing surface) S5 facing the subject 3 and a surface (image-facing surface) S6 facing the image surface S7. The surface S5 and the surface S6 are not particularly limited in shape.

In FIG. 1, the length of a segment connecting (i) a point of intersection s5 between the surface S4 of the second lens L2 and the optical axis La of the image pickup lens 1 with (ii) that portion s6 of the image surface S7 which is closest to the point of intersection s5 is represented by d3. That is, the length d3 represents the shortest direct distance between the point of intersection s5 and the image surface S7. It should be noted, however, that the length d3 is a length in air. The term "length in air" means a length obtained by dividing the geometric length of a medium by the refractive index of the medium. More specifically, the term "length in air" means the total of lengths obtained by dividing the geometric lengths of media (all the media present between the point of intersection s5 and the portion s6) by the refractive indices of the media, respectively.

Furthermore, in FIG. 1, the whole length of the image pickup lens 1 along the X direction (whole optical length of the image pickup lens) is represented by d. It should be noted, however, the whole length d of the image pickup lens 1 means the whole length of the image pickup lens 1 as an optical system. Specifically, the whole length d of the image pickup lens 1 represents the direct distance along the X direction, i.e. along the optical axis La of the image pickup lens 1, between that portion of a place (A) or (B) which is closest to the subject 3 and the image surface S7. It should be noted here that (A) indicates a place in the aperture stop 2 that is made larger or smaller to let more or less light in and (B) indicates a place in the first lens L1 where light from the outside of the image pickup lens 1 enters. In general, the whole optical length of an optical system means the total of dimensions of all components of the optical system along the optical axis, with the dimensions having a certain influence on the optical characteristics of the optical system. Since the image pickup lens 1 of FIG. 1 is configured, as mentioned above, such that the center s1 of the surface S1 of the first lens L1 sticks out from the aperture stop 2 toward the subject 3, the "portion . . . which is closest to the subject 3" is the center s1 of the surface S1. Meanwhile, although not shown here, when the aperture stop 2 is closer to the subject 3 than the center s1 of the surface S1 of the first lens L1 is, the whole length d of the image pickup lens 1 means the direct distance between the aperture stop 2 and the image surface S7. In this case, however, the "portion . . . which is closest to the subject 3" is chosen from a place in the aperture stop 2 that is actually made larger or smaller to let more or less light in, regardless of the structural thickness of the aperture stop 2.

When combined with the second lens L2 provided in a place closer to the image surface S7 than the first lens L1 is, the configuration in which the aperture stop 2 and the first lens L1, which is a meniscus lens whose convex surface faces the subject 3, are sequentially arranged along the direction from the subject 3 to the image surface S7 allows a small-size, low-height optical system to correct various aberrations such as coma aberrations, astigmatism, field curvatures, and distortions and lower the angle of incidence of a chief ray upon the image surface S7. Various aberrations can be corrected because the first lens L1 and the second lens L2 combine to correct various aberrations. The angle of incidence of a chief ray upon the image surface S7 can be lowered because the second lens L2 bends a beam of light condensed by the first lens L1. This allows the image pickup lens 1 to improve in resolving power.

The surface S3 of the second lens L2 includes a convex surface that extends over a central portion including the center s3 of the surface S3 and an area around the center s3, and includes a concave surface that extends along that peripheral portion of the surface S3 which is farther from the center s3 than the central portion is. According to this configuration, a ray of light that passes through the second lens L2 near the centers s3 and s4 becomes capable of forming an image in a place closer to the subject 3 along the X direction, and a ray of light that passes through the second lens L2 near that peripheral portion of the second lens L2 which is farther from the centers s3 and s4 becomes capable of forming an image in a place closer to the image surface S7 along the X direction. For this reason, the image pickup lens 1 can correct various aberrations such as field curvatures in accordance with the degree to which the surface S3 sticks out toward the subject 3 and the degree to which the surface S3 sinks in toward the image surface S7. Further, according to this configuration, the second lens L2 as a whole becomes able to be used as a lens having a positive (or negative) refracting power as the first lens L1 does. This makes it possible to reduce asymmetry between the first lens L1 and the second lens L2. As a result, the image pickup lens 1 can decrease adverse effects of errors, if any, such as shifts in position (eccentricity) of the optical axis La along the Y direction between the surfaces S1 and S2 and between the surfaces S3 and S4, respectively, and variations in the thickness of the first lens L1 and the second lens L2, respectively. Therefore, the permissible scope of such errors can be broadened substantially.

For the whole length d of the image pickup lens 1 along the X direction, the distance d1 between the centers of the surfaces of the first lens L1, the distance d2 between the centers of the surfaces of the first lens L2, and the length (length in air) d3 of the segment between the point of intersection s5 and that portion s6 of the image surface S7 which is closest to the point of intersection s5, the image pickup lens 1 satisfies at least one of mathematical expressions (1) to (3):

$$0.30 < d1/d < 0.45 \qquad (1)$$

$$0.10 < d2/d < 0.23 \qquad (2)$$

$$0.20 < d3/d < 0.35 \qquad (3).$$

If mathematical expression (1) is satisfied, the shapes of the surfaces S1 and S2 can be changed modestly. That is, the degree to which the surfaces S1 and S2 stick out or sink in along the X direction can be made smaller. Furthermore, the distance between the surface S1 and the surface S2 along the X direction can be broadened. Having satisfied mathematical expression (1), the image pickup lens 1 can decrease adverse effects of errors, if any, such as shifts in position (eccentricity) of the optical axis La along the Y direction between the surfaces S1 and S2 and between the surfaces S3 and S4, respectively, and variations in the thickness of the first lens L1 and the second lens L2, respectively. Therefore, the permissible scope of such errors can be broadened substantially.

If mathematical expression (2) is satisfied, the second lens L2 can be placed so that its surfaces S3 and S4 are close to the image surface S7; therefore, various aberrations such as field curvatures can be corrected.

If mathematical expression (3) is satisfied, the second lens L2 can be placed so that its surface S4 is close to the image surface S7; therefore, various aberrations such as distortions can be corrected.

Thus, even when the image pickup lens 1 is made smaller in size and lower in height, there is no longer a strong demand imposed on the image pickup lens 1. This makes it comparatively easy to manufacture an image pickup lens that satisfies the imposed demand. For this reason, the image pickup lens 1 allows a reduction in manufacturing cost required to satisfy the imposed demand, and easily maintains its desired resolving power because of a reduction in the frequency of variations in the manufacture.

When d1/d is less than or equal to 0.30, the first lens L1 becomes thinner; therefore, the shape of the surface S1 of the first lens L1 is changed greatly for a greater positive refracting power. That is, it is undesirably necessary to increase the degree to which the convex surface sticks out. When d1/d is greater than or equal to 0.45, the surface S1 of the first lens L1 becomes too close to the image surface S7, whereby it undesirably becomes difficult to correct various aberrations such as field curvatures. Therefore, in order to achieve the effects of an image pickup lens according to the present embodiment, the image pickup lens 1 needs to have a value of d1/d that satisfies mathematical expression (1).

When d2/d is less than or equal to 0.10, a difference in power distribution between a central portion of the second lens L2 (areas around the centers s3 and s4) and a peripheral portion therearound (i.e., a difference between the positive power of the second lens L2 in the central portion and the negative power of the second lens L2 in the peripheral portion) becomes smaller, whereby it undesirably becomes difficult to correct various aberrations such as field curvatures. When d2/d is greater than or equal to 0.23, both the surfaces S3 and S4 of the second lens L2 become remote from the image surface S7. In this case, it undesirably becomes difficult to correct various aberrations such as field curvatures. Therefore, in order to achieve the effects of an image pickup lens according to the present embodiment, the image pickup lens 1 needs to have a value of d2/d that satisfies mathematical expression (2).

When d3/d is less than or equal to 0.20, the surface S4 of the second lens L2 physically interferes with the image surface S7. Furthermore, when the cover glass CG is provided, the surface S4 of the second lens L2 physically interferes with the cover glass CG. Thus, when d3/d is less than or equal to 0.20, it is virtually impossible to further satisfy mathematical expression (1). This undesirably leaves no other choice but to lessen the effect of broadening the permissible scope of errors. When the d3/d is greater than or equal to 0.35, the second lens L2 becomes remote from the image surface S7. This undesirably makes it difficult to satisfactorily correct aberrations such as field curvatures and distortions. Therefore, in order to achieve the effects of an image pickup lens according to the present embodiment, the image pickup lens 1 needs to have a value of d3/d that satisfies mathematical expression (3).

Further, it is preferable that the image pickup lens 1 further satisfy mathematical expression (4):

$$1.30 < f1/f < 3.00 \qquad (4),$$

where f is the focal length of the image pickup lens 1 as a whole and f1 is the focal length of the first lens L1.

scope of errors. Therefore, in order to achieve the effects of an image pickup lens according to the present embodiment, the image pickup lens 1 needs to have a value of f2/f that satisfies mathematical expression (5).

Table 1 shows an example of a formula for designing a lens system using an image pickup lens 1.

TABLE 1

| Configuration | Elements | | | Curvature [mm$^{-1}$] | Center thickness [mm] | Effective radius [mm] | Aspheric coefficients | | |
|---|---|---|---|---|---|---|---|---|---|
| | Nd | vd | Surfaces | | | | K | A4 | A6 |
| L1 | 1.53 | 56 | S1/Stop | 1.12012 | 0.889 | 0.276 | 0.00E+00 | 2.91E−01 | −4.42E+01 |
| | | | S2 | 0.63323 | 0.211 | 0.451 | 0.00E+00 | −2.03E+00 | 1.61E+01 |
| L2 | 1.53 | 56 | S3 | 1.59932 | 0.351 | 0.567 | 0.00E+00 | −2.15E+00 | −2.91E+00 |
| | | | S4 | 1.09785 | 0.186 | 0.722 | 0.00E+00 | −5.52E−01 | −3.07E+00 |
| CG | 1.52 | 64 | S5 | 0.00000 | 0.500 | — | — | — | — |
| | | | S6 | 0.00000 | 0.050 | — | — | — | — |
| Image surface | | | S7 | 0.00000 | 0.000 | 0.880 | — | — | — |

| Configuration | Elements | | | Aspheric coefficients | | | | |
|---|---|---|---|---|---|---|---|---|
| | Nd | vd | Surfaces | A8 | A10 | A12 | A14 | A16 |
| L1 | 1.53 | 56 | S1/Stop | 2.64E+03 | −7.05E+04 | 8.34E+05 | −3.60E+06 | 0.00E+00 |
| | | | S2 | −9.94E+01 | 5.09E+02 | −1.76E+03 | 2.73E+03 | 0.00E+00 |
| L2 | 1.53 | 56 | S3 | 5.51E+01 | −3.32E+02 | 6.26E+02 | 4.58E+02 | −2.19E+03 |
| | | | S4 | 1.78E+01 | −7.55E+01 | 1.76E+02 | −2.06E+02 | 9.05E+01 |
| CG | 1.52 | 64 | S5 | — | — | — | — | — |
| | | | S6 | — | — | — | — | — |
| Image surface | | | S7 | — | — | — | — | — |

The image pickup lens 1 thus obtained can be a small-size image pickup lens with spherical aberrations corrected satisfactorily.

When f1/f is less than or equal to 1.30, the image pickup lens 1 undesirably becomes so narrower in angle of view that the required angle of an image pickup lens 1 to be applied to an image pickup module 60 or 70 (see FIGS. 6 and 7) cannot be satisfied. When f1/f is greater than or equal to 3.00, an increase in field curvature and distortions may undesirably entail a decrease in resolving power of the image pickup lens 1. Therefore, in order to achieve the effects of an image pickup lens according to the present embodiment, the image pickup lens 1 needs to have a value of f1/f that satisfies mathematical expression (4).

Further, it is preferable that the image pickup lens 1 further satisfy mathematical expression (5):

$$1.00 < f2/f < 2.60 \qquad (5),$$

where f2 is the focal length of the second lens L2.

The image pickup lens 1 thus obtained can be a small-size image pickup lens with field curvatures corrected satisfactorily.

When f2/f is less than or equal to 1.00, the second lens L2 decreases in positive refracting power, if it has a positive refracting power at all, whereby the permissible scope of errors are undesirably narrowed down. When f2/f is greater than or equal to 2.60, the second lens L2 increases excessively in positive refracting power, if it has a positive refracting power at all. Moreover, it becomes necessary to increase the degree (change in shape) to which the second lens L2 sinks in toward the image surface S7, and such an increase in the degree of sinking undesirably narrows down the permissible The first and second lenses L1 and L2 of the image pickup lens 1 according to Table 1 were produced by injection molding with thermoplastic resin.

The lens system including the image pickup lens 1 as shown in Table 1 had an F number of 2.8 and an image circle diameter of 1.76 mm. The term "image circle diameter" means the size of an effective image circle of an image resolved by a lens.

The term "F number" means a kind of amount that represents the brightness of an optical system. The F number of the image pickup lens 1 is expressed as a value obtained by dividing the equivalent focal length of the image pickup lens 1 by the incident pupil diameter of the image pickup lens 1. It is preferable that the image pickup lens 1 have an F number of 3 or less. This allows the image pickup lens 1 to increase the amount of light that it receives and obtain a high resolving power because of satisfactory corrections to chromatic aberrations.

Nd denotes the refractive index on d-rays (at a wavelength of 587.6 nm) of each member constituting the image pickup lens, and vd denotes the Abbe number of each member on d-rays.

The term "center thickness of a surface (center thickness)" means the distance between the center of the corresponding surface and the center of the next surface toward the image surface along the optical axis. The term "effective radius" means the radius of a circular region in a lens where the range of a beam of light can be regulated. The term "aspheric coefficient" means a coefficient Ai (where i is an even number of 4 or greater) in mathematical expression (6), which is an aspheric formula for an aspheric surface. The description of values "(Constant a) E (Constant b)" in Tables represents "(Constant a)×10 raised to the power of (Constant b)". For example, "2.91E-01" represents "2.91×10$^{-1}$".

[Math. 1]

$$Z = \frac{x^2 \times 1/R}{1 + \sqrt{1-(1+K)\times x^2 \times 1/R}} + \sum_{\substack{i=4 \\ (even\ number)}} A_i \times x^i \qquad (6)$$

In mathematical expression (6), Z is a coordinate on the optical axis, x is a coordinate on a line normal to the optical axis, R is the curvature radius, and K the conic coefficient (K may sometimes be treated as an aspheric coefficient).

The conditions of the image pickup lens 1 for the results shown in Table 1 were as follows: f=1.547 mm, f1=2.654 mm, f2=2.618 mm, d=2.188 mm, d1=0.889 mm, d2=0.351 mm, and d3=0.566 mm.

From the values of f, f1, f2, d, and d 1 to d3 above, the following results were obtained, approximately: f1/f=1.716, f2/f=1.692, d1/d=0.406, d2/d=0.160, and d3/d=0.259. The angle of view (angle within which the image pickup lens can take an image) was 60.5°, with f1/f2 equal to 1.0, R2/R1 equal to 1.8, d2/d12 equal to 1.7, f/f1 equal to 0.6, R1/f equal to 0.58, and d12/f1 equal to 0.08, where d12 means the distance between d1 and d2.

Figure 2:
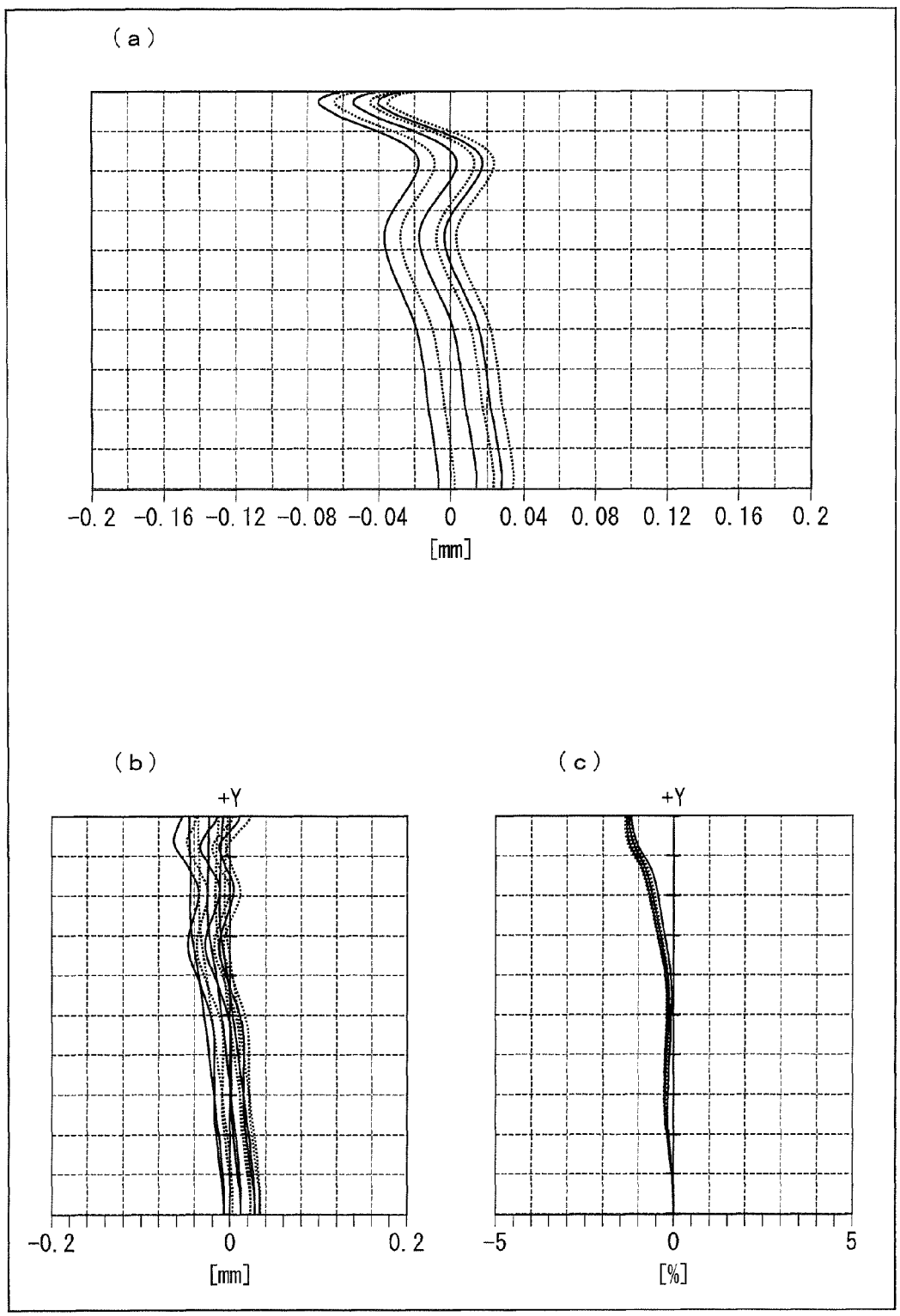
FIG. 2 shows graphs (a) through (c) showing the characteristics of various aberrations of the image pickup lens of FIG. 1, the graphs (a) through (c) showing the characteristic of a spherical aberration, the characteristic of astigmatism, and the characteristic of a distortion, respectively.

FIG. 2 shows graphs (a) through (c) showing the characteristics of various aberrations of the image pickup lens 1, the graphs (a) through (c) showing the characteristic of a spherical aberration, the characteristic of astigmatism, and the characteristic of a distortion, respectively. In each of the graphs shown in FIG. 2, the vertical axis represents displacements of the image surface S7 along the Y direction, and the horizontal axis represents the magnitude of each aberration.

From the small amounts of remaining aberrations (small shifts in magnitude of each aberration with respect to the displacements along the Y direction), it is found that the image pickup lens 1 is small in size, low in height, and satisfactory in optical characteristic.

The spherical aberration shown in (a) of FIG. 2, the astigmatism shown in (b) of FIG. 2, and the distortion shown in (c) of FIG. 2 are the results of aberrations on a total of six types of incident light of different wavelengths of 405 nm, 436 nm, 486 nm, 546 nm, 588 nm, and 656 nm. Each of the graphs (a) and (b) shown in FIG. 2 shows aberrations at different wavelengths of 405 nm, 436 nm, 486 nm, 546 nm, 588 nm, and 656 nm, with the curves arranged in this order starting from the left on the drawing. In (b) of FIG. 2, those curves which are comparatively large in band of fluctuation along the horizontal axis represent aberrations with respect to the tangential surface, and those curves which are comparatively small in band of fluctuation along the horizontal axis represent aberrations with respect to the sagittal surface.

The term "sagittal surface" means the trajectory of an image point as formed in an optical system of rotational symmetry by a ray of light (sagittal ray), among rays of light coming from an object point off the optical axis of the optical system and entering the optical system, which is included in a plane (sagittal plane) perpendicular to a plane containing a chief ray and the optical axis. The term "tangential surface" means an image surface that is formed by a beam of light (bundle of meridional rays) perpendicular to a bundle of sagittal rays and including a chief ray. Since the terms "sagittal surface" and "tangential surface" are both commonly-used optical terms, they will not be further explained.

Figure 3:
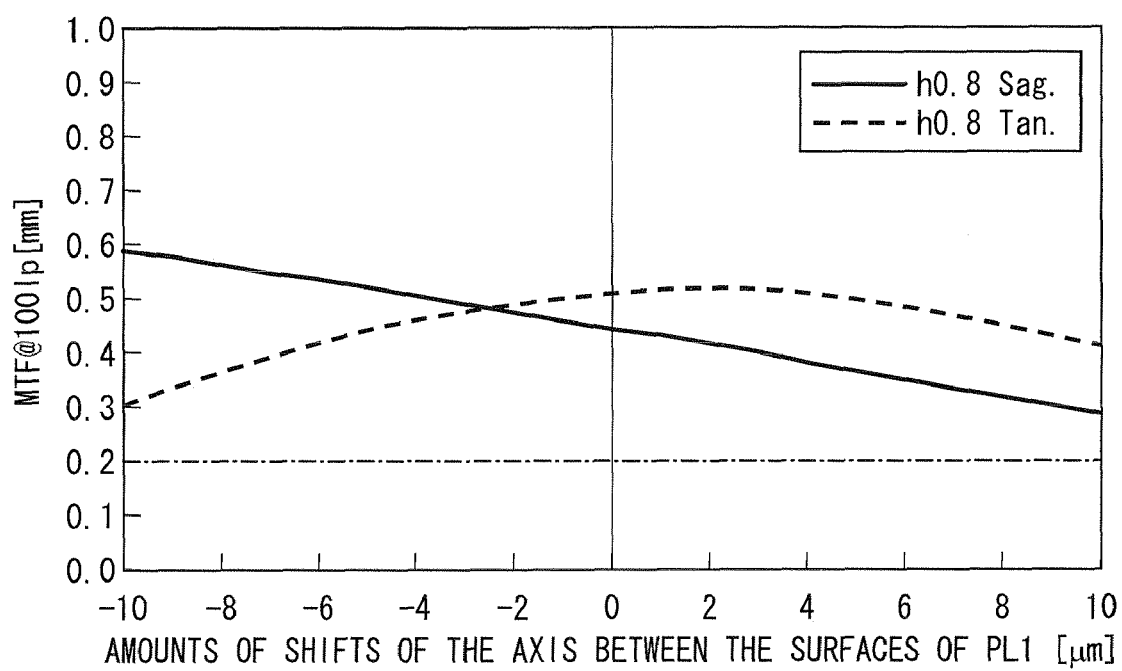
FIG. 3 is a graph showing the relationship of changes in MTF with respect to shifts in position of the optical axis between both surfaces of a first lens of the image pickup lens of FIG. 1.

FIG. 3 is a graph showing the relationship of changes in MTF with respect to shifts in position of the optical axis between the surfaces S1 and S2 of the first lens L1 of the image pickup lens 1. In the graph shown in FIG. 3, the vertical axis represents MTF, and the horizontal axis represents shifts in position of the optical axis between the surfaces S1 and S2 of the first lens L1. The solid line "h0.8 Sag." indicates the characteristics of the image pickup lens 1 with respect to the sagittal surface at an image height h of 0.8. The dotted line "h0.8 Tan." indicates the characteristics of the image pickup lens 1 with respect to the tangential surface at an image height h of 0.8. The term "image height" means the height of an image with reference to the center of the image. Moreover, the height of an image with respect to the maximum image height is expressed as a percentage. The image height is expressed as an image height h of 0.8 as above (or else may be sometimes expressed as eight-in-ten image height, h8.0, etc.) to indicate a place at an image height corresponding to 80% of the maximum image height with reference to the center of the image.

Figure 17:
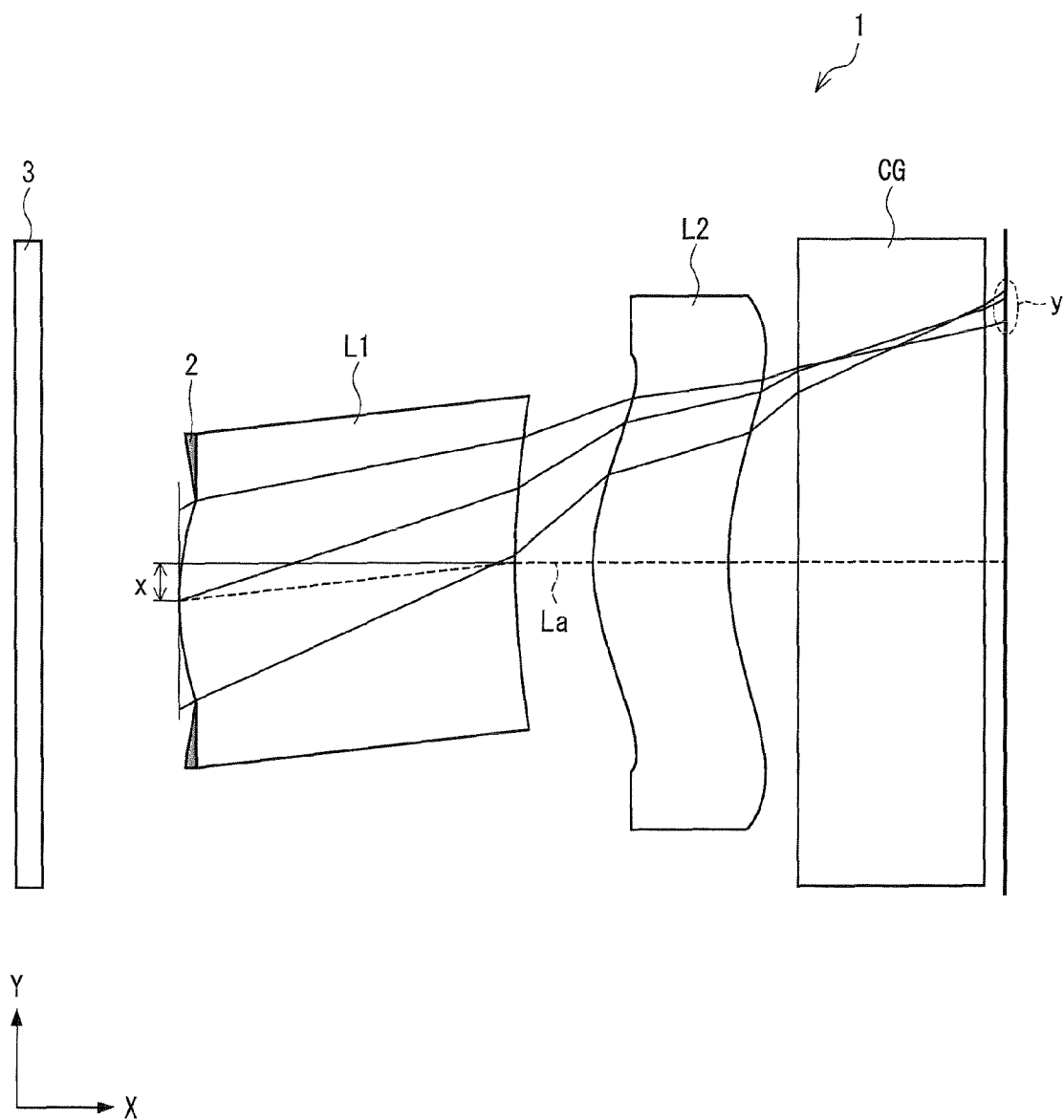
FIG. 17 is a cross-sectional view for explaining the value of MTF with respect to a spatial frequency of 100 lp/mm at an image height h of 0.8 and the amount of a maximum shift in position (parallel eccentricity) of the optical axis along a normal line between both surfaces of the first lens.

More specifically, the vertical axis represents the value of MTF with respect to a spatial frequency of 100 lp/mm at an image height h of 0.8 (see y in FIG. 17). The horizontal axis represents the amount of a maximum shift in position (parallel eccentricity) of the optical axis La along the Y direction (see FIG. 1) between the surfaces S1 and S2 of the first lens L1 (see x in FIG. 17). At "0" on the horizontal axis, the optical axis La extends straight along the X direction; and the present embodiment assumes that the eccentricity is 0 μm at "0" on the horizontal axis.

According to the graph shown in FIG. 3, even when the amount of parallel eccentricity between the surfaces S1 and S2 of the first lens L1 is approximately −4 to 4 μm, the amount of change in MTF with respect to the tangential surface is less than 10%. In the case of an ordinary image pickup lens, when the amount of parallel eccentricity between the surfaces S1 and S2 of the first lens L1 is approximately −2 to 2 μm, the amount of change in MTF with respect to the tangential surface is as large as approximately 10%.

That is, although standards for setting manufacturing tolerance (MTF here) to be satisfied vary according to the targeted performance; for example, according to the graph shown in FIG. 3, the value of MTF at a spatial frequency of 100 lp/mm can be 0.2 or greater, regardless of whether the amount of parallel eccentricity between the surfaces S1 and S2 of the first lens L1 is 10 μm or greater or −10 μm or less (see the dashed line of FIG. 3). This shows that the permissible scope of errors with respect to the parallel eccentricity between the surfaces S1 and S2 of the first lens L1 has been broadened. In general, the amount of parallel eccentricity between the surfaces S1 and S2 of the first lens L1 is smaller in permissible scope than the amount of parallel eccentricity between the first lens L1 and the second lens L2 and the amount of parallel eccentricity between the surfaces S3 and S4 of the second lens L2. Therefore, the manufacture of image pickup lenses 1 is greatly simplified in comparison with the manufacture of conventional image pickup lenses.

Figure 4:
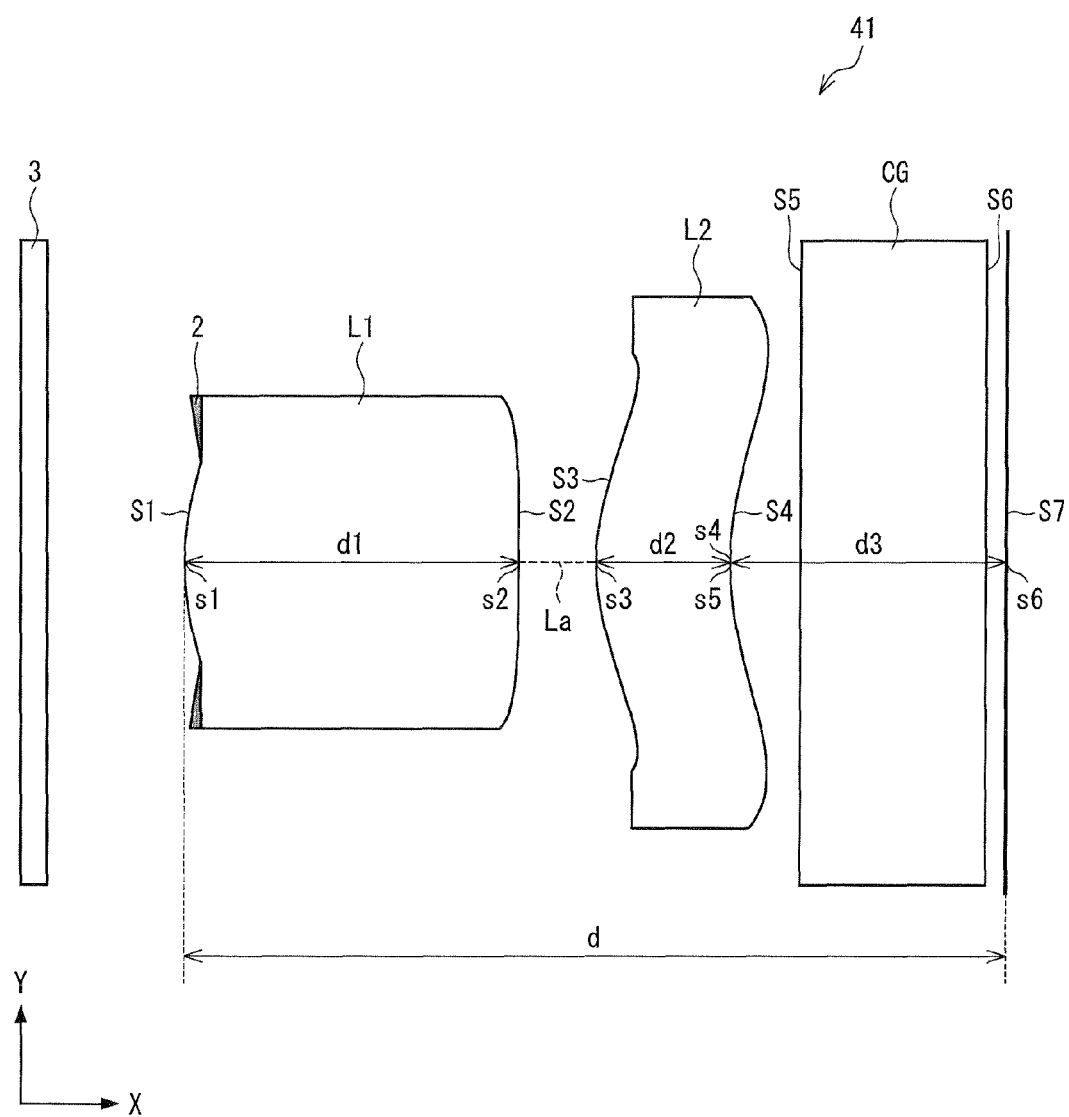
FIG. 4 is a cross-sectional view showing the configuration of an image pickup lens according to another embodiment.

FIG. 4 is a cross-sectional view showing the configuration of an image pickup lens 41 according to another embodiment of the present invention.

The image pickup lens 41 of FIG. 4 differs from the configuration of the image pickup lens 1 of FIG. 1 in the shape of that surface S2 of the first lens L1 which faces the image surface S7. The surface S2 is configured such that its peripheral portion (outer portion), which is at the edge of the surface S2, sinks in closer to the subject 3 than is its central portion, which includes the center s2 and an area there around.

The image pickup lens 41 is superior in wide-angle function to the image pickup lens 1 because the shape formed on the center s2 of the surface S2 of the first lens L1 and an area around the center s2 to stick out toward the image surface S7 bends a wide-angle incident ray toward the center of the image surface S7, thereby making it possible to form an image in a region within which the sensor 62 (see FIG. 6) takes an image.

In other respects, the image pickup lens 41 is identical to the image pickup lens 1.

Table 2 shows an example of a formula for designing a lens system using an image pickup lens 41.

TABLE 2

| Configuration | | | | | Center | Effective | | | |
| | | | | Curvature | thickness | radius | Aspheric coefficients | | |
| uration | Nd | vd | Surfaces | [mm$^{-1}$] | [mm] | [mm] | K | A4 | A6 |
| --- | --- | --- | --- | --- | --- | --- | --- | --- | --- |
| L1 | 1.53 | 56 | S1/Stop | 0.85299 | 0.682 | 0.230 | 0.00E+00 | −3.74E−01 | −1.65E+01 |
| | | | S2 | 0.33731 | 0.167 | 0.437 | 0.00E+00 | −3.86E+00 | 2.12E+01 |
| L2 | 1.53 | 56 | S3 | 1.83666 | 0.377 | 0.506 | 0.00E+00 | −3.47E+00 | 2.40E+00 |
| | | | S4 | 1.01274 | 0.229 | 0.704 | 0.00E+00 | 3.06E−01 | −7.28E+00 |
| CG | 1.52 | 64 | S5 | 0.00000 | 0.500 | — | — | — | — |
| | | | S6 | 0.00000 | 0.050 | — | — | — | — |
| Image surface | | | S7 | 0.00000 | 0.000 | 0.880 | — | — | — |

| Configuration | | | | Aspheric coefficients | | | | |
| uration | Nd | vd | Surfaces | A8 | A10 | A12 | A14 | A16 |
| --- | --- | --- | --- | --- | --- | --- | --- | --- |
| L1 | 1.53 | 56 | S1/Stop | 1.70E+03 | −5.76E+04 | 8.68E+05 | −4.94E+06 | 0.00E+00 |
| | | | S2 | −5.44E+01 | −3.91E+02 | 2.73E+03 | −4.76E+03 | 0.00E+00 |
| L2 | 1.53 | 56 | S3 | 3.49E+01 | −5.04E+02 | 1.16E+03 | 3.65E+03 | −1.57E+04 |
| | | | S4 | 2.28E+01 | −6.82E+01 | 1.66E+02 | −2.46E+02 | 1.46E+02 |
| CG | 1.52 | 64 | S5 | — | — | — | — | — |
| | | | S6 | — | — | — | — | — |
| Image surface | | | S7 | — | — | — | — | — |

As in the case of Table 1, the lens system including the image pickup lens 41 as shown in Table 2 had an F number of 2.8 and an image circle diameter of 1.76 mm. It is preferable that, as with the image pickup lens 1, the image pickup lens 41 have an F number of 3 or less. This allows the image pickup lens 41 to increase the amount of light that it receives and obtain a high resolving power because of satisfactory corrections to chromatic aberrations.

The terms and variables used in Table 2 are defined in the same manner as those used in Table 1.

The conditions of the image pickup lens 41 for the results shown in Table 2 were as follows: f=1.286 mm, f1=3.211 mm, f2=1.755 mm, d=2.005 mm, d1=0.682 mm, d2=0.377 mm, and d3=0.609 mm.

From the values of f, f1, f2, d, and d1 to d3 above, the following results were obtained, approximately: f1/f=2.497, f2/f=1.365, d1/d=0.340, d2/d=0.188, and d3/d=0.304. The angle of view was as wide as 75.3°, with f1/f2 equal to 1.8, R2/R1 equal to 2.5, d2/d12 equal to 2.3, f/f1 equal to 0.4, R1/f equal to 0.91, and d12/f1 equal to 0.05.

Figure 5:
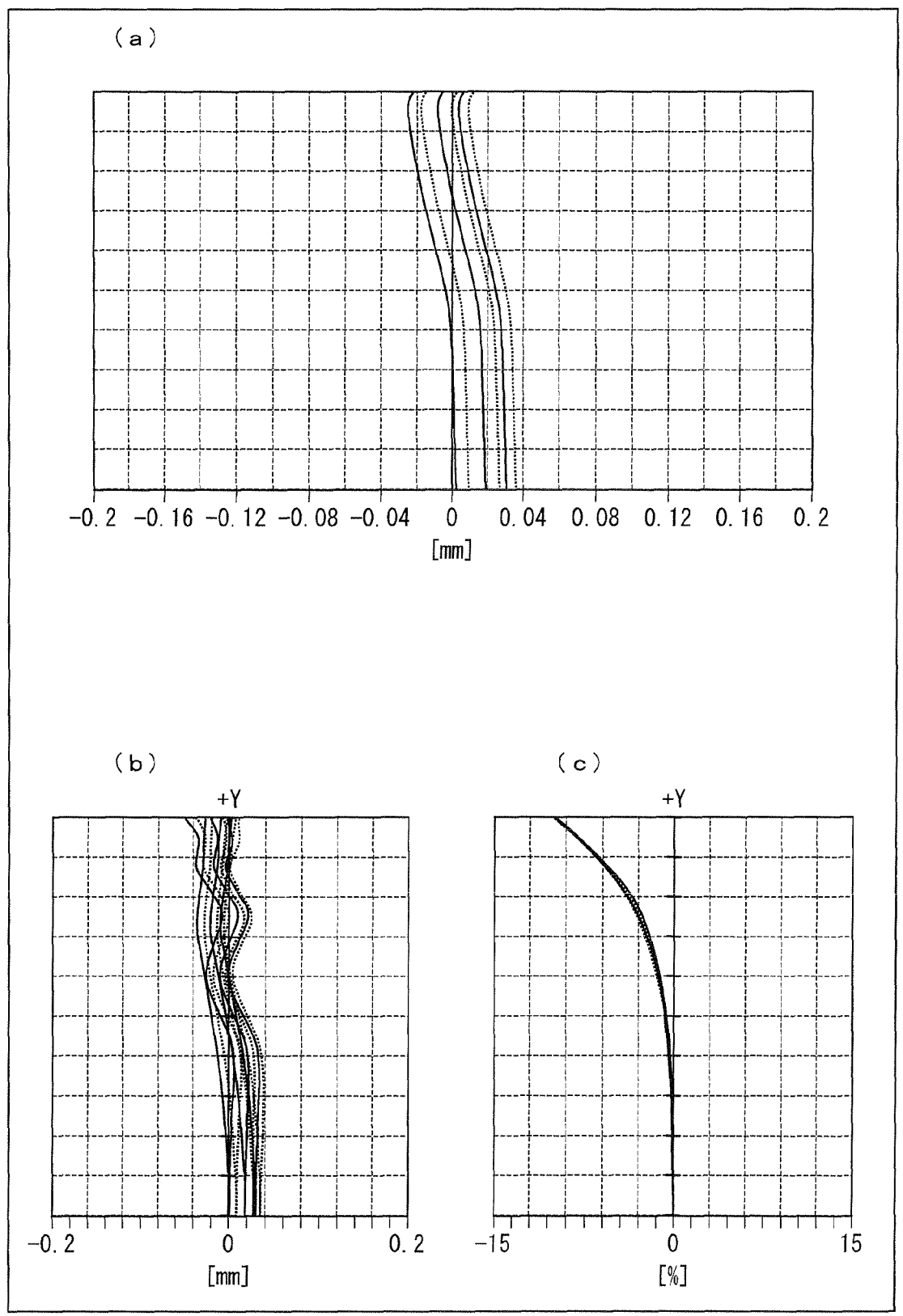
FIG. 5 shows graphs (a) through (c) showing the characteristics of various aberrations of the image pickup lens of FIG. 4, the graphs (a) through (c) showing the characteristic of a spherical aberration, the characteristic of astigmatism, and the characteristic of a distortion, respectively.

FIG. 5 shows graphs (a) through (c) showing the characteristics of various aberrations of the image pickup lens 41, the graphs (a) through (c) showing the characteristic of a spherical aberration, the characteristic of astigmatism, and the characteristic of a distortion, respectively.

From the small amounts of remaining aberrations (small shifts in magnitude of each aberration with respect to the displacements along the Y direction), it is found that the image pickup lens 41 is small in size, low in height, and satisfactory in optical characteristic.

The spherical aberration shown in (a) of FIG. 5, the astigmatism shown in (b) of FIG. 5, and the distortion shown in (c) of FIG. 5 are the results of aberrations on a total of six types of incident light of different wavelengths of 405 nm, 436 nm, 486 nm, 546 nm, 588 nm, and 656 nm. Each of the graphs (a) and (b) shown in FIG. 5 shows aberrations at different wavelengths of 405 nm, 436 nm, 486 nm, 546 nm, 588 nm, and 656 nm, with the curves arranged in this order starting from the left on the drawing. In (b) of FIG. 5, those curves which are comparatively large in band of fluctuation along the horizontal axis represent aberrations with respect to the tangential surface, and those curves which are comparatively small in band of fluctuation along the horizontal axis represent aberrations with respect to the sagittal surface.

Table 3 shows an example of a formula for designing a lens system using an image pickup lens 1'.

TABLE 3

| Configuration | | | | | Center | Effective | | | |
| | | | | Curvature | thickness | radius | Aspheric coefficients | | |
| uration | Nd | vd | Surfaces | [mm$^{-1}$] | [mm] | [mm] | K | A4 | A6 |
| --- | --- | --- | --- | --- | --- | --- | --- | --- | --- |
| L1 | 1.50 | 46 | S1/Stop | 1.13E+00 | 0.829 | 0.274 | 0.00E+00 | 3.79E−02 | −3.63E+00 |
| | | | S2 | 3.75E−01 | 0.284 | 0.448 | 0.00E+00 | −1.55E+00 | 1.47E+01 |

TABLE 3-continued

| | | | | | | | | | |
|---|---|---|---|---|---|---|---|---|---|
| L2 | 1.50 | 46 | S3 | 1.59E+00 | 0.321 | 0.591 | 0.00E+00 | −1.65E+00 | −1.51E+00 |
| | | | S4 | 1.23E+00 | 0.177 | 0.743 | 0.00E+00 | −2.61E−02 | −9.64E+00 |
| CG | 1.52 | 64 | S5 | 0.00E+00 | 0.500 | — | — | — | — |
| | | | S6 | 0.00E+00 | 0.050 | — | — | — | — |
| Image surface | | | S7 | 0.00E+00 | 0.000 | 0.880 | — | — | — |

| Elements | | | | Aspheric coefficients | | | | | |
|---|---|---|---|---|---|---|---|---|---|
| Config- uration | Nd | vd | Surfaces | A8 | A10 | A12 | A14 | A16 | |
| L1 | 1.50 | 46 | S1/Stop | 6.76E+01 | −6.85E+02 | 2.84E+03 | 0.00E+00 | 0.00E+00 | |
| | | | S2 | −1.08E+02 | 5.72E+02 | −1.74E+03 | 2.25E+03 | 0.00E+00 | |
| L2 | 1.50 | 46 | S3 | −1.88E+01 | 3.40E+02 | −2.14E+03 | 5.79E+03 | −5.97E+03 | |
| | | | S4 | 5.34E+01 | −1.83E+02 | 3.50E+02 | −3.42E+02 | 1.27E+02 | |
| CG | 1.52 | 64 | S5 | — | — | — | — | — | |
| | | | S6 | — | — | — | — | — | |
| Image surface | | | S7 | — | — | — | — | — | |

The image pickup lens 1' according to Table 3 is an applied example of the image pickup lens 1 according to Table 1. The image pickup lens 1' differs from the image pickup lens 1 in that the image pickup lens 1' is produced by a wafer-level lens process with thermosetting resin. A method according to the present invention for manufacturing an image pickup lens, including the wafer-level lens process, will be detailed later. At least either the first lens L1 or the second lens L2 may be made of thermosetting resin. Further, instead of thermosetting resin, UV (ultraviolet) curable resin may be used. The thermosetting resin is a resin that has a property of changing in state from a liquid to a solid under a predetermined amount of heat. The ultraviolet curable resin is a resin that has a property of changing in state from a liquid to a solid when irradiated with ultraviolet rays at a predetermined level of intensity.

As in the case of Table 1, the lens system including the image pickup lens 1' as shown in Table 3 had an F number of 2.8 and an image circle diameter of 1.76 mm.

In the lens system including the image pickup lens 1' as shown in Table 3, both the first lens L1 and the second lens L2 have small Abbe numbers vd of 50 or less.

The terms and variables used in Table 3 are defined in the same manner as those used in Table 1.

The conditions of the image pickup lens 1' for the results shown in Table 3 were as follows: f=1.533 mm, f1=2.301 mm, f2=3.522 mm, d=2.160 mm, d1=0.829 mm, d2=0.321 mm, d3=0.556 mm.

From the values of f, f1, f2, d, and d1 to d3 above, the following results were obtained, approximately: f1/f=1.501, f2/f=2.297, d1/d=0.384, d2/d=0.149, and d3/d=0.257. The angle of view was 60.7°, with f1/f2 equal to 0.7, R2/R1 equal to 3.0, d2/d12 equal to 1.1, f/f1 equal to 0.7, R1/f equal to 0.58, and d12/f1 equal to 0.12.

Figure 8:
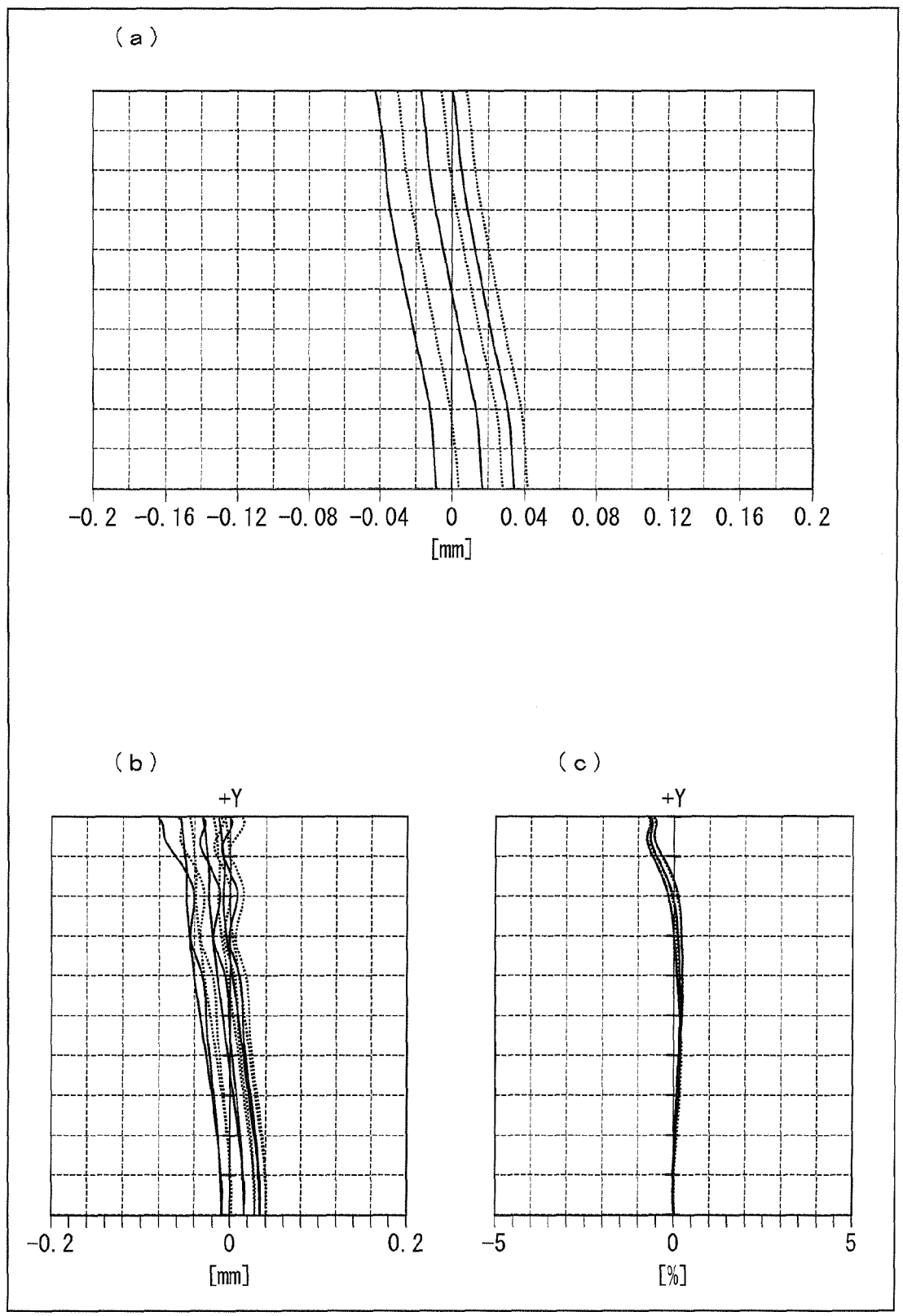
FIG. 8 shows graphs (a) through (c) showing the characteristics of various aberrations of an applied example of the image pickup lens of FIG. 1, the graphs (a) through (c) showing the characteristic of a spherical aberration, the characteristic of astigmatism, and the characteristic of a distortion, respectively.

FIG. 8 shows graphs (a) through (c) showing the characteristics of various aberrations of the image pickup lens 1', the graphs (a) through (c) showing the characteristic of a spherical aberration, the characteristic of astigmatism, and the characteristic of a distortion, respectively.

From the small amounts of remaining aberrations (small shifts in magnitude of each aberration with respect to the displacements along the Y direction), it is found that the image pickup lens 1' is small in size, low in height, and satisfactory in optical characteristic.

Figure 9:
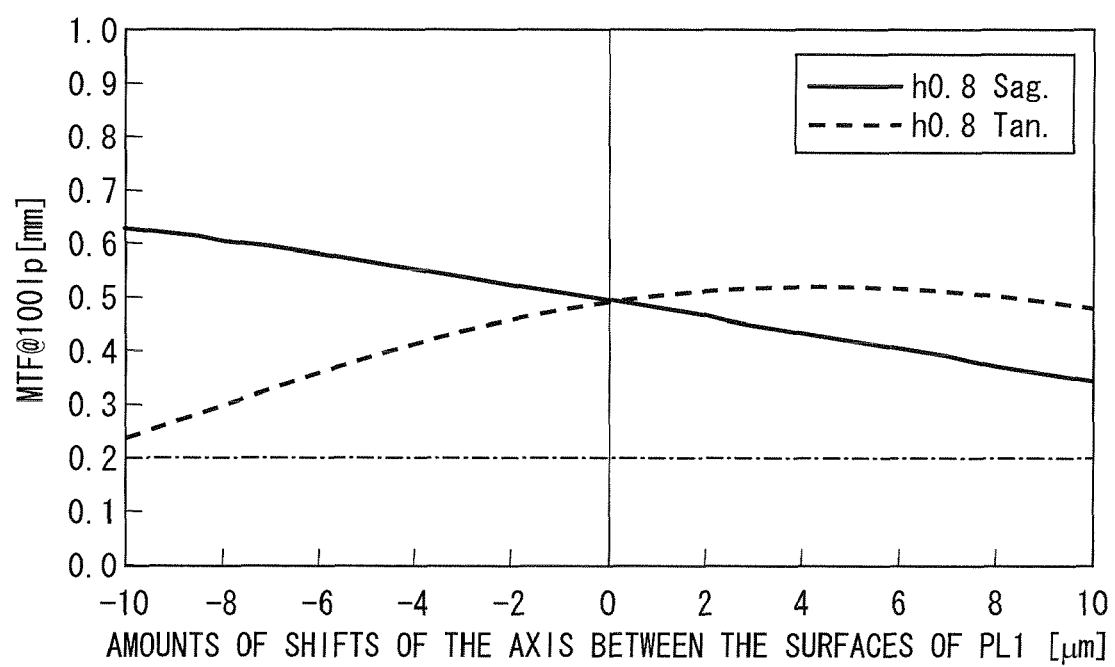
FIG. 9 is a graph showing the relationship of changes in MTF with respect to shifts in position of the optical axis between both surfaces of a first lens of the applied example.

FIG. 9 is a graph showing the relationship of changes in MTF with respect to shifts in position of the optical axis between the surfaces S1 and S2 of the first lens L1 of the image pickup lens 1'. The definitions in the graph shown in FIG. 9 are the same as those in the graph shown in FIG. 3.

For example, according to the graph shown in FIG. 9, the value of MTF at a spatial frequency of 100 lp/mm can be 0.2 or greater, regardless of whether the amount of parallel eccentricity between the surfaces S1 and S2 of the first lens L1 is 10 μm or greater or −10 μm or less (see the dashed line of FIG. 9). This shows that the permissible scope of errors with respect to the parallel eccentricity between the surfaces S1 and S2 of the first lens L1 has been broadened. Therefore, the manufacture of image pickup lenses 1' is greatly simplified in comparison with the manufacture of conventional image pickup lenses.

Table 4 shows an example of a formula for designing a lens system using a conventional image pickup lens 100, as an example comparison with the image pickup lenses according to Tables 1 through 3.

TABLE 4

| Elements | | | | Curvature | Center thickness | Effective radius | Aspheric coefficients | | |
|---|---|---|---|---|---|---|---|---|---|
| Config- uration | Nd | vd | Surfaces | [mm⁻¹] | [mm] | [mm] | K | A4 | A6 |
| L1 | 1.53 | 56 | S1/Stop | 2.26E+00 | 0.327 | 0.277 | 0.00E+00 | 2.30E−01 | −3.40E+00 |
| | | | S2 | 1.20E+00 | 0.270 | 0.266 | 0.00E+00 | 1.18E−01 | 1.17E+02 |
| L2 | 1.53 | 56 | S3 | −4.15E−01 | 0.516 | 0.331 | 0.00E+00 | −1.73E+00 | −4.14E+01 |
| | | | S4 | −2.06E−01 | 0.135 | 0.611 | 0.00E+00 | −3.74E−01 | −3.47E+00 |
| CG | 1.52 | 64 | S5 | 0.00E+00 | 0.500 | — | — | — | — |
| | | | S6 | 0.00E+00 | 0.050 | — | — | — | — |
| Image | | | S7 | 0.00E+00 | 0.000 | 0.880 | — | — | — |

TABLE 4-continued surface

| Configuration | Elements | | | Aspheric coefficients | | | | |
|---|---|---|---|---|---|---|---|---|
| | Nd | vd | Surfaces | A8 | A10 | A12 | A14 | A16 |
| L1 | 1.53 | 56 | S1/Stop | 2.02E+02 | −2.65E+03 | 1.33E+04 | 0.00E+00 | 0.00E+00 |
| | | | S2 | −2.56E+03 | 2.87E+04 | −8.06E+04 | 0.00E+00 | 0.00E+00 |
| L2 | 1.53 | 56 | S3 | 4.79E+02 | −2.58E+03 | −5.47E+03 | 0.00E+00 | 0.00E+00 |
| | | | S4 | 6.18E+00 | 4.67E+00 | −3.22E+01 | 0.00E+00 | 0.00E+00 |
| CG | 1.52 | 64 | S5 | — | — | — | — | — |
| | | | S6 | — | — | — | — | — |
| Image surface | | | S7 | — | — | — | — | — |

Figure 10:
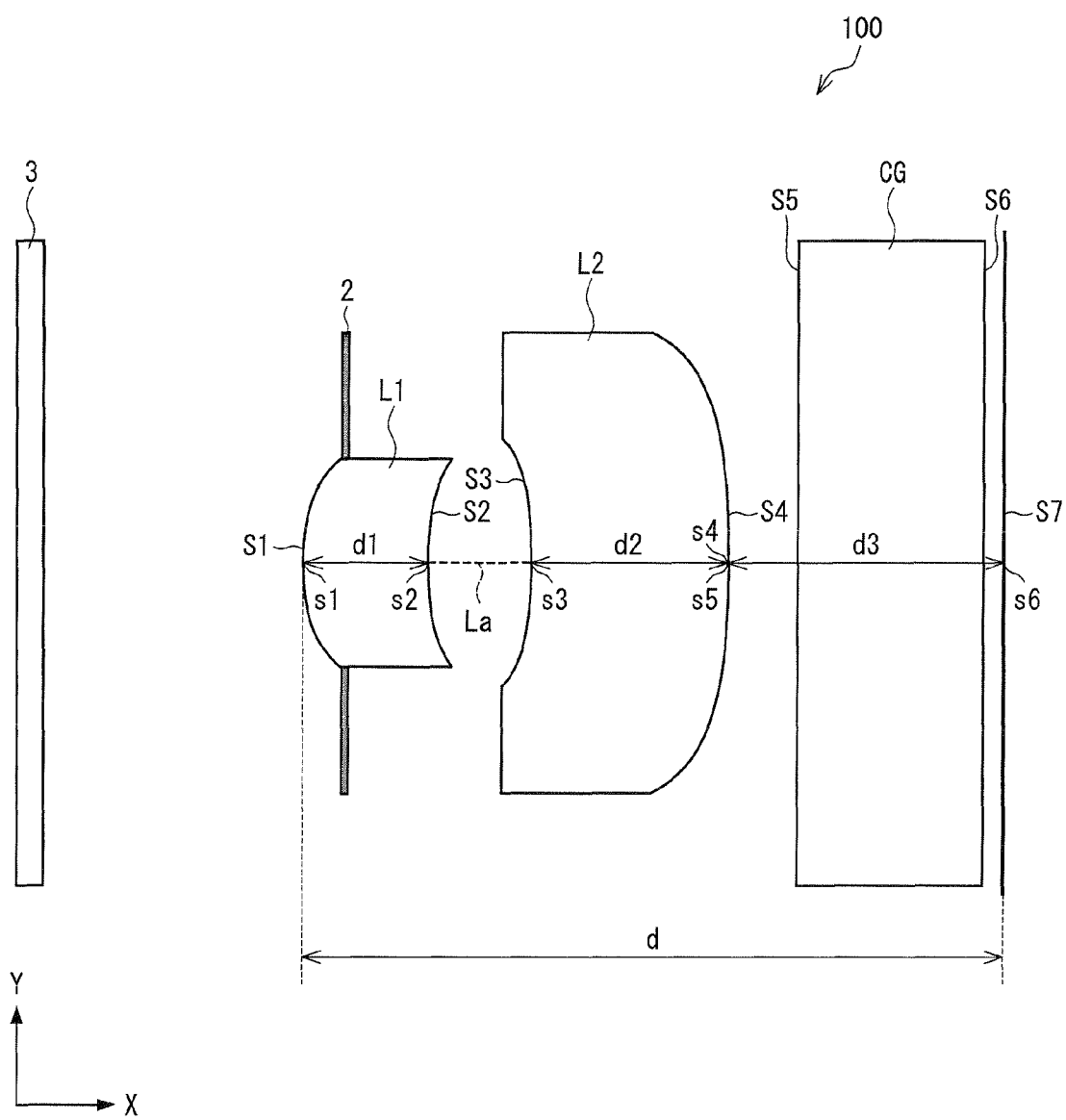
FIG. 10 is a cross-sectional view showing the configuration of a conventional image pickup lens in comparison with the image pickup lenses according to the present embodiment.

The image pickup lens 100 is such a telescopic image pickup lens as mentioned above (see Patent Literature 1). The image pickup lens 100 is a double-lens system in which the aperture stop 2, the first lens L1, which is a meniscus lens with a positive refracting power whose convex surface faces the subject 3, and the second lens L2, which is a biconcave lens with a negative refracting power, are sequentially arranged along the direction from the subject 3 to the image surface S7 (see FIG. 10).

As in the case of Table 1, the lens system including the image pickup lens 100 as shown in Table 4 had an F number of 2.8 and an image circle diameter of 1.76 mm.

The terms and variables used in Table 4 are defined in the same manner as those used in Table 1.

The conditions of the image pickup lens 100 for the results shown in Table 4 were as follows: f=1.547 mm, f1=1.371 mm, f2=−9.702 mm, d=1.798 mm, d1=0.327 mm, d2=0.516 mm, d3=0.514 mm.

From the values of f, f1, f2, d, and d1 to d3 above, the following results were obtained, approximately: f1/f=0.886, f2/f=−6.271, d1/d=0.182, d2/d=0.287, and d3/d=0.286. The angle of view was 61.0°.

Figure 11:
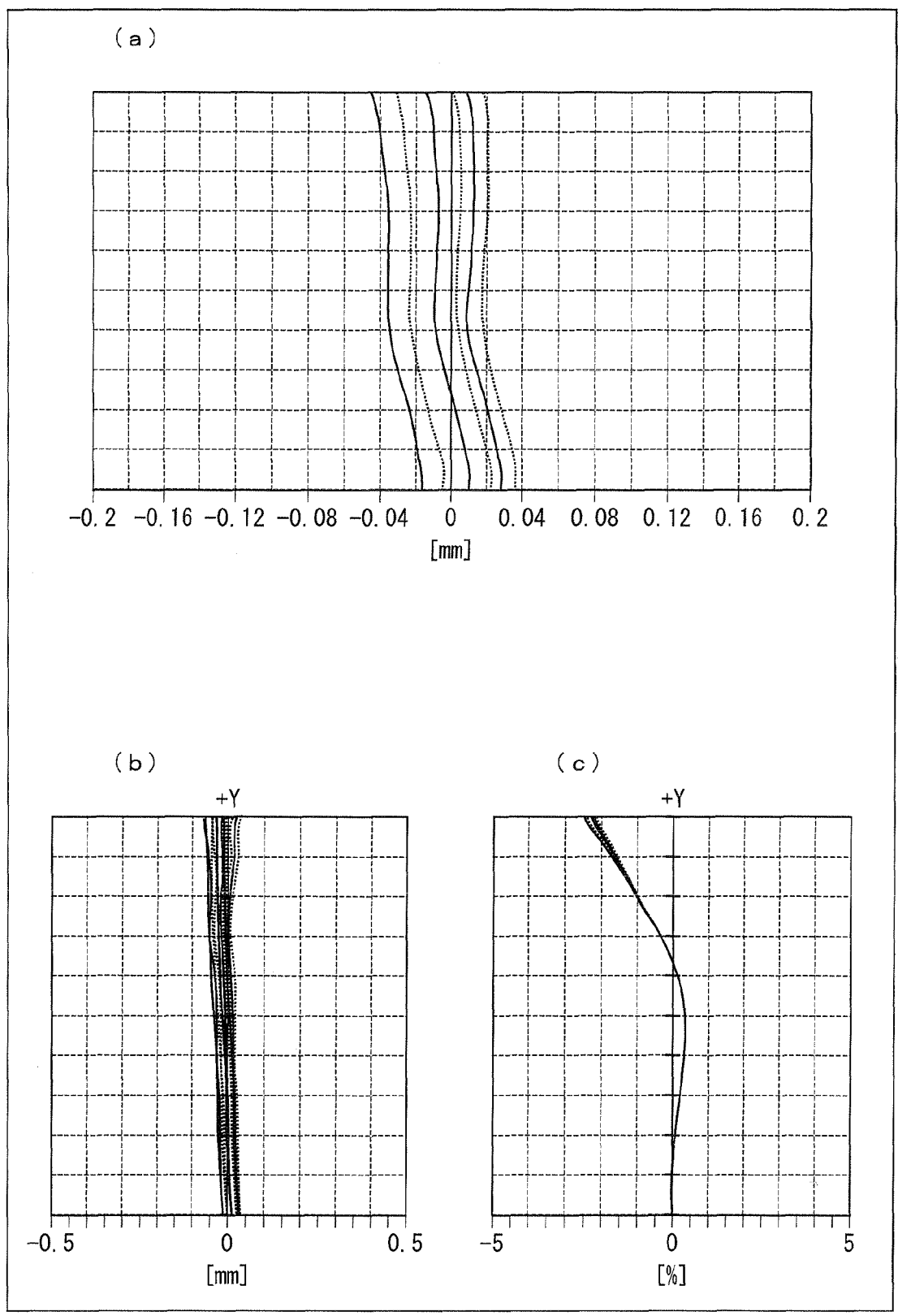
FIG. 11 shows graphs (a) through (c) showing the characteristics of various aberrations of the image pickup lens of FIG. 10, the graphs (a) through (c) showing the characteristic of a spherical aberration, the characteristic of astigmatism, and the characteristic of a distortion, respectively.

FIG. 11 shows graphs (a) through (c) showing the characteristics of various aberrations of the image pickup lens 1', the graphs (a) through (c) showing the characteristic of a spherical aberration, the characteristic of astigmatism, and the characteristic of a distortion, respectively.

From the small amounts of remaining aberrations (small shifts in magnitude of each aberration with respect to the displacements along the Y direction), it is found that the image pickup lens 100 is small in size, low in height, and satisfactory in optical characteristic.

Figure 12:
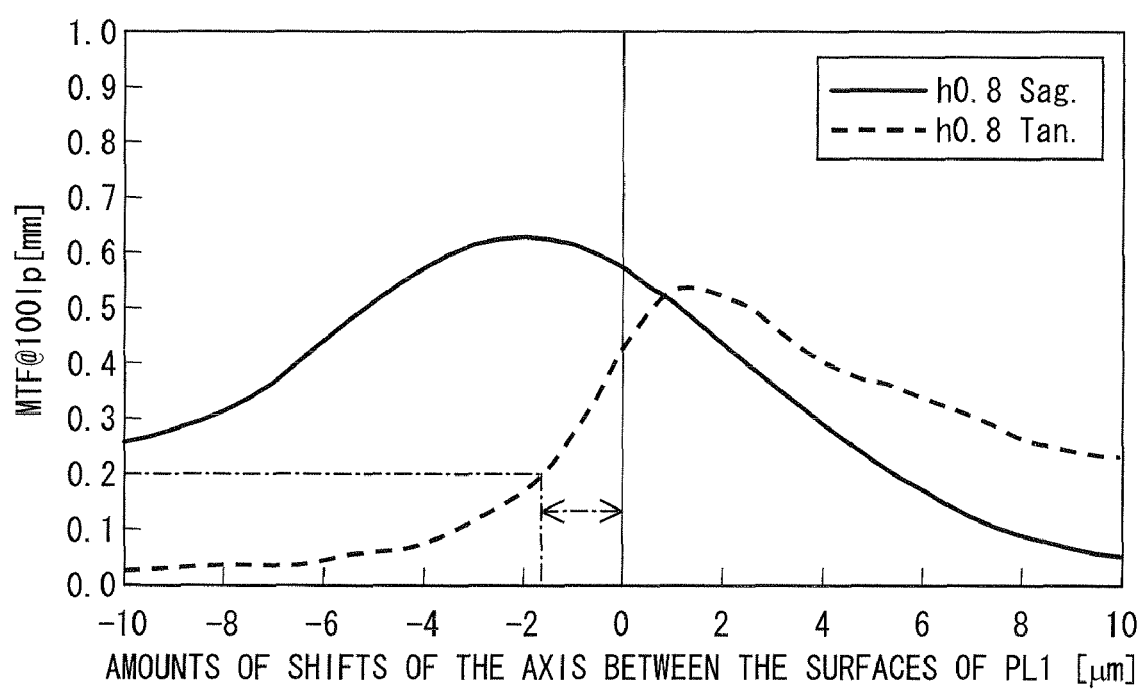
FIG. 12 is a graph showing the relationship of changes in MTF with respect to shifts in position of the optical axis between both surfaces of a first lens of the image pickup lens of FIG. 10.

FIG. 12 is a graph showing the relationship of changes in MTF with respect to shifts in position of the optical axis between the surfaces S1 and S2 of the first lens L1 of the image pickup lens 100. The definitions in the graph shown in FIG. 12 are the same as those in the graph shown in FIG. 3.

For example, according to the graph shown in FIG. 12, the value of MTF at a spatial frequency of 100 lp/mm cannot be 0.2 or greater until the amount of parallel eccentricity between the surfaces S1 and S2 of the first lens L1 is in a range of approximately −2 μm to 4 μm. If the amount of parallel eccentricity falls short of approximately −2 μm (becomes larger in absolute value and therefore the degree of parallel eccentricity becomes larger), the MTF with respect to the tangential surface becomes less than 0.2 (see the dashed line of FIG. 12). Similarly, if the amount of parallel eccentricity exceeds approximately 4 μm, the MTF with respect to the sagittal surface becomes less than 0.2. This shows that the image pickup lens 100 has a much narrower permissible scope of errors with respect to the parallel eccentricity between the surfaces S1 and S2 of the first lens L1 than the image pickup lenses 1, 41, and 1' do.

Thus, image pickup lenses 1, 41, and 1' according to the present invention have a broader permissible scope of errors with respect to eccentricity than conventional image pickup lenses do. Therefore, the manufacture of image pickup lenses 1, 41, and 1' is greatly simplified.

[Image Pickup Module]

FIG. 6 is a cross-sectional view showing the configuration of an image pickup module 60 according to still another embodiment of the present invention.

The image pickup module 60 of FIG. 6 includes a first lens L1, a second lens L2, a cover glass CG, a housing 61, and a sensor 62. The image pickup module 60 has an aperture stop 2 (see FIG. 1) formed integrally with the housing 61. Specifically, the aperture stop 2 corresponds to that portion of the housing 61 which covers an upper surface (which corresponds to the surface S1 shown in FIG. 1) of the first lens L1 so that a convex surface formed as part of the upper surface is exposed. That is, the image pickup module 60 can be interpreted as being configured to include an image pickup lens 1 (see FIG. 1), a housing 61, and a sensor 62.

The housing 61 is a housing for putting the image pickup lens 1 in, and is formed by a light-blocking member.

The sensor 62 is an image pickup device constituted by a solid-state image sensing device such as CCD image sensor or a CMOS image sensor. The constitution of the sensor 62 with use of a solid-state image sensing device allows the image pickup module 60 to be small in size and low in height. In particular, in image pickup modules 60 that are mounted into portable terminals (not shown) such as portable information terminals and portable phones, the constitution of the sensors 62 with use of solid-state image sensing devices makes it possible to realize image pickup modules that are high in resolving power, small in size, and low in height.

In the case of constitution of the sensor 62 with use of a solid-state image sensing device, it is preferable that the solid-state image sensing device have a pixel pitch of 2.5 μm or less. The constitution of the sensor 62 with use of a solid-state image sensing device having a pixel pitch of 2.5 μm or less allows the image pickup module 60 to make full use of the performance of the image pickup device having a large number of pixels.

By including the image pickup lens 1, the image pickup module 60 brings about the same effects as the image pickup lens 1.

Furthermore, the image pickup module 60 has various aberrations sufficiently corrected by the effects of the image pickup lens 1 that it includes. Further, the image pickup lens 1 of the image pickup module 60 has a broad permissible scope of errors such as eccentricity and variations in the thickness of the first lens L1 and the second lens L2 (see FIG. 1). For this reason, even if the image pickup module 60 does not include an adjustment mechanism (not shown) for adjusting the distance between the image pickup lens 1 and the image surface S7 or a body tube (not shown), the adverse effects on the maintenance of resolving power are small (see FIG. 1). The omission of the adjustment mechanism and the body tube allows the image pickup module 60 to be smaller in size, lower in height, and lower in cost.

Because the image pickup lens 1 has a broad permissible scope of manufacturing errors, the use of the image pickup lens 1 allows the image pickup module 60 to be constituted as a simple-structured image pickup module without a mechanism for adjusting the distance between the lens and the image surface.

FIG. 7 is a cross-sectional view showing the configuration of an image pickup module 70 according to still another embodiment of the present invention.

The image pickup module 70 of FIG. 7 is an image pickup module obtained by omitting the housing 61 from the image pickup module 60 of FIG. 6. As such, the image pickup module 70 has its aperture stop 2 provided in the same form as that of the image pickup lens 1 of FIG. 1.

Further, the image pickup module 70 of FIG. 7 differs from the image pickup module 60 of FIG. 6 in that an outer portion of a lower surface (which corresponds the surface S4 shown in FIG. 1) of the second lens L2, i.e. an edge portion of the second lens L2, is placed above the sensor 62 via the cover glass CG.

The image pickup module 70 does not need to have a housing 61 for putting the image pickup lens 1 in. The omission of the housing 61 allows the image pickup module 70 to be smaller in size, lower in height, and lower in cost.

The image pickup module 70 is based on the image pickup module 60 structured not to include an adjustment mechanism (not shown) or a body tube (not shown). Furthermore, the image pickup lens 1 of the image pickup module 70 has a very small distance between the lower surface of the second lens L2 and the cover glass CG. The image pickup module 70 makes a simple-structured image pickup module 70 without the need for a housing 61 by forming the second lens L2 integrally with a portion for installation on the cover glass CG with a small deviation ratio of thickness of the lens.

In other respects, the image pickup module 70 is identical to the image pickup module 60.

The image pickup lenses that are provided in the image pickup modules 60 and 70 may be image pickup lenses 41 of FIG. 4 or image pickup lenses 1', i.e. applied examples of image pickup lenses 1, other than image pickup lenses 1 of FIG. 1.

The present embodiment has as a feature to provide: an image pickup lens that is an imaging lens system, constituted by two lenses, which has excellent imaging capability with a wide angle of view up to the surrounding area and which has good manufacturability; and an image pickup module in which such an image pickup lens is used. Further, the present embodiment also has as a problem to realize an optical system which has excellent imaging capability with a wide angle of view and which is superior in manufacturing tolerance. In order to attain the feature by solving the problem, the present embodiment can be interpreted as having adopted a configuration in which: the first lens L1 has a positive refracting power; the second lens L2 takes the shape of a surface having an inflection point in addition to a positive refracting power; the distance d1 between the centers of the surfaces of the first lens L1, which corresponds to the thickness of the first lens L1, is large; and the length d3, which corresponds to the distance between the second lens L2 and the sensor 62, is small (back-focus is short). Thus, through realization of an optical system excellent in imaging capability and tolerance sensitivity, the present invention can be applied to many lens processes and camera modules with the aim of low cost and simple structures (e.g., configurations that do not require focus adjustment).

[Method for Manufacturing an Image Pickup Lens and an Image Pickup Module]

Figure 13:
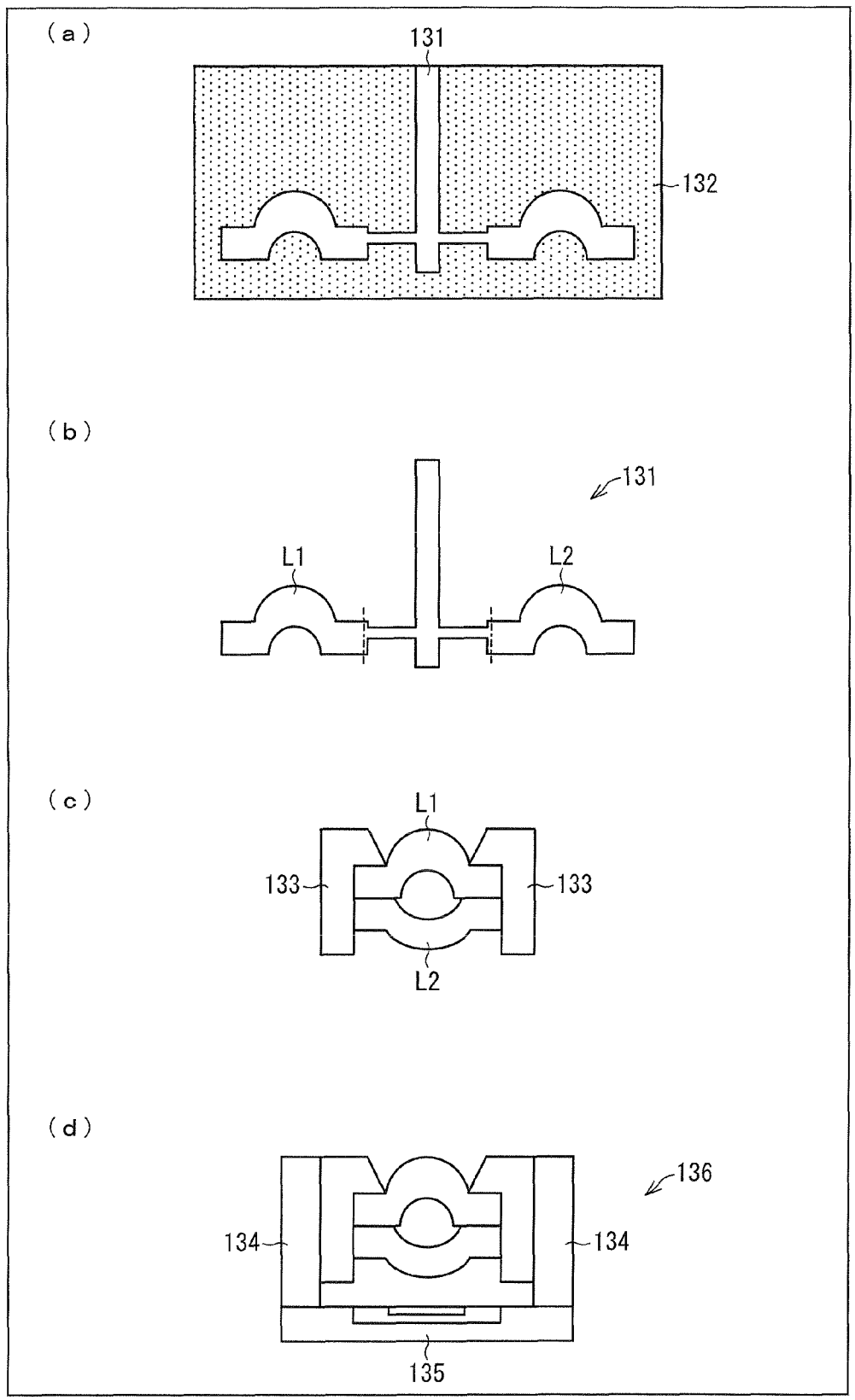
FIG. 13 shows cross-sectional views (a) through (d) showing a conventional method for manufacturing an image pickup lens and an image pickup module.

First, a brief overview of a common method for manufacturing an image pickup module 136, on which a method according to the present embodiment for manufacturing an image pickup module is premised, is provided with reference to (a) through (d) of FIG. 13.

The first lens L1 and the second lens L2 are produced mainly by injection molding with thermoplastic resin 131. Specifically, the first lens L1 and the second lens L2 are formed by softening the thermoplastic resin 131 by heat, forcing the thermoplastic resin 131 into a mold 132 at a predetermined injection pressure (approximately 10 to 3,000 kgf/c), and filling the mold 132 with the thermoplastic resin 131 (see (a) of FIG. 13).

After the molding, the thermoplastic resin 131 is taken out from the mold 132, and then cut into each separate lens. In this example, the thermoplastic resin 131 taken out from the mold 132 is cut into the first lens L1 and the second lens L2 (see (b) of FIG. 13).

The first lens L1 and the second lens L2 are fitted into (or pressed into) a lens barrel (housing) 133 for assembly (see (c) of FIG. 13).

The intermediate product shown in (c) of FIG. 13 for the image pickup modules 136 is fitted into a body tube 134 for assembly. After that, a sensor 135 is mounted on that end of the body tube 134 which faces the image surface (not shown). Thus, the image pickup module 136 is completed (see (d) of FIG. 13).

The thermoplastic resin 131, of which the first lens L1 and the second lens L2, i.e. the injection molded lenses, are made, has a deflection temperature under loading (heat distortion temperature) of approximately 130° C. For this reason, the thermoplastic resin 131 is insufficient in resistance to a thermal history (whose maximum temperature is approximately 260° C.) during execution of reflowing, which is a technique that is applied mainly to surface mounting. Therefore, the thermoplastic resin 131 cannot resist heat that is generated during reflowing.

Consequently, before the image pickup module 136 is mounted onto a substrate, only the sensor 135 section is mounted by reflowing. After that, a method of joining the first lens L1 and second lens L2 section with resin or a mounting method of locally heating the area where the first lens L1 and second lens L2 are mounted is adopted.

In the following, a method according to the present embodiment for manufacturing an image pickup module 148 is described with reference to (a) through (e) of FIG. 14.

In recent years, the development of a so-called heat-resistant camera module whose first lens L1 and/or second lens L2 is/are made of thermosetting resin or ultraviolet curable resin has been advanced. The image pickup module 148 described here is such a heat-resistant camera module whose first lens L1 and second lens L2 are made of thermosetting resin 141, instead of being made of the thermoplastic resin 131 (see (a) of FIG. 13).

When the first lens L1 and/or second lens L2 is/are made of the thermosetting resin 141, the cost of manufacturing image pickup modules 148 can be reduced by batch-manufacturing a large number of image pickup modules 148. Alternatively, when the first lens L1 and second lens L2 are made of the thermosetting resin 141, reflowing can be performed on image pickup modules 148.

There have been proposed various techniques for manufacturing image pickup modules 148. Of these techniques, the aforementioned injection molding and the after-mentioned wafer-level lens process are representative. In particular, the wafer-level lens (reflowable lens) process has recently drawn attention as being more advantageous in terms of the time that it takes to manufacture image pickup modules and other comprehensive knowledge.

In the execution of the wafer-level lens process, it is necessary to prevent the first lens L1 and the second lens L2 from suffering from plastic deformation due to heat. Because of this necessity, wafer level lenses made of a highly heat-resistant thermosetting resin material or ultraviolet curable resin material that resists deformation even under heat have drawn attention as the first lens L1 and the second lens L2. Specifically, wafer level lenses made of such a heat-resistant thermosetting resin material or ultraviolet curable resin material that does not suffer from plastic deformation even under heat of 260 to 280° C. for ten seconds or longer have drawn attention. According to the wafer-level lens process, image pickup modules 148 are manufactured by batch-molding an array of lenses (array of first lenses) 144 and an array of lenses (array of second lenses) 145 in array-shaped molds 142 and 143, respectively, joining the array of lenses 144 and the array of lenses 145, mounting an array of sensors 147, and then cutting an array of image pickup modules 148 into separate image pickup modules 148.

The following describes the details of the wafer-level lens process.

Figure 14:
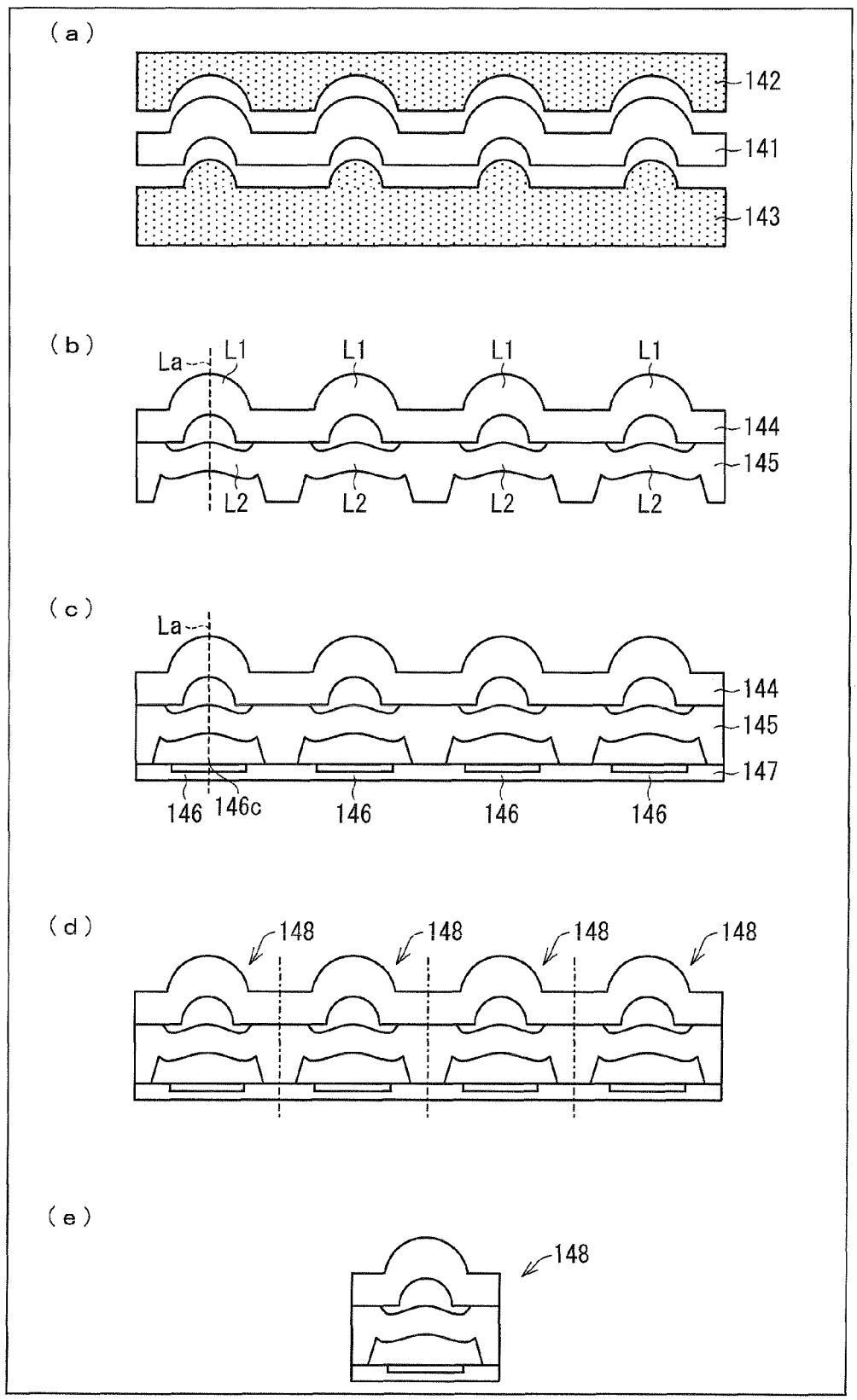
FIG. 14 shows cross-sectional views (a) through (e) showing a method according to the present invention for manufacturing an image pickup lens and an image pickup module.

First, according to the wafer-level lens process, an array of lenses is produced by: sandwiching the thermosetting resin 141 between the array-shaped mold 142, which has a large number of concavities formed therein, and the array-shaped mold 143, which has a large number of convexities formed therein to correspond to the concavities; curing the thermosetting resin 141; and molding a lens for each combination of each of the concavities and its corresponding one of the convexities (see (a) of FIG. 14).

The arrays of lenses that are produced in the step shown in (a) of FIG. 14 are the array of lenses 144, which has a large number of first lenses L1 molded, and the array of lenses 145, which has a large number of second lenses L2 molded. The array of lenses 144 and the array of lenses 145 are joined so that each of the first lenses L1 has its optical axis La (optical axis of the first lens) passing therethrough on the same straight line as the optical axis La (optical axis of the second lens) of its corresponding second lens L2 (see (b) of FIG. 14). Specifically, examples of how the arrays of lenses 144 and 145 are aligned encompass various ways, such as making adjustments while taking images, other than aligning the optical axes La with each other. Further, the alignment is affected by the pitch precision with which the wafer is finished.

On that end of the array of lenses 145 which faces the image surface S7 (see FIG. 1), the array of sensors 147, which has a large number of sensors 146 mounted, is mounted so that each optical axis La is on the same straight line as the center 146c of its corresponding sensor 146 (see (c) of FIG. 14).

In the step shown in (c) of FIG. 14, the array of a large number of image pickup modules 148 is cut into each separate image pickup module 148 (see (d) of FIG. 14), whereby the image pickup module 148 is completed (see (e) of FIG. 14).

In the steps shown in (a) through (e) of FIG. 14, the timing of providing aperture stops 2 (see FIG. 1) is not particularly limited and, as such, has been omitted from the illustration for convenience of explanation. If the mounting of the sensors 146 is omitted by omitting the step shown in (c) of FIG. 14, image pickup lenses can be manufactured at low cost in the same manner as the image pickup modules.

According to the wafer-level lens process shown above in (a) through (e) of FIG. 14, the cost of manufacturing image pickup modules 148 can be reduced by batch-manufacturing a large number of image pickup modules 148. Furthermore, in order to prevent the first lens L1 and the second lens L2 from suffering from plastic deformation due to heat (whose highest temperature is approximately 260° C.) that is generated by reflowing in mounting a completed image pickup module 148 on a substrate (not shown), it is more preferable that the first lens L1 and the second lens L2 be made of a heat-resistant thermosetting resin material or ultraviolet curable resin material that is resistant to heat of 260 to 280° C. for ten seconds or longer. The first lens L1 and the second lens L2, made of heat-resistant thermosetting resin or ultraviolet curable resin, makes it possible to perform reflowing on the image pickup module 148. The application of a heat-resistant resin material to the wafer-level manufacturing steps makes it possible to inexpensively manufacture image pickup modules on which reflowing can be performed.

The configuration in which the first lens L1 and/or the second lens L2 is/are made of thermosetting resin may be applied to an image pickup lens 1 (i.e., an image pickup lens 1') and an image pickup module including such an image pickup lens, and may be applied to an image pickup lens 41 and an image pickup module including such an image pickup lens. An image pickup module 148 can be interpreted as being a specific example of an image pickup module including an image pickup lens 1' according to Table 3 above.

The following looks at materials, suitable to manufacturing image pickup modules 148, of which first lenses L1 and second lenses L2 can be made.

Conventionally, thermoplastic resin materials have been mainly used as materials for plastic lenses; therefore, there is a wide range of materials.

Figure 16:
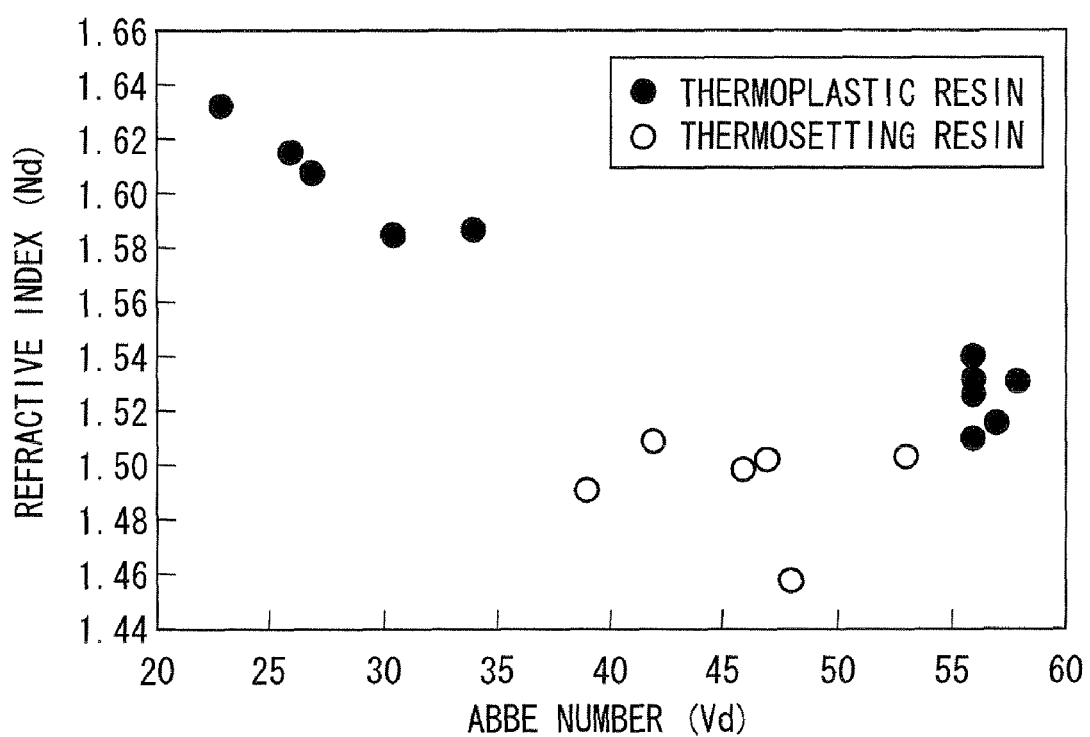
FIG. 16 is a graph showing the relationships shown in FIG. 15.

Meanwhile, thermosetting resin materials and ultraviolet curable resin materials have not been fully developed for use as first lenses L1 or second lenses L2 and, as such, are currently inferior to the thermoplastic resin materials in diversity and optical constant, and expensive. In general, the optical constant of a material with a low refractive index and low dispersivity is preferable. Further, it is preferable that there be a wide range of optical constants to choose from in optical design (see FIGS. 15 and 16).

The following looks at advantages brought about by the configuration in which image pickup lenses 1, 41, and 1' each have an aperture stop 2 formed so that the convex surface formed as part of the surface S1 of the first lens L1 sticks out from the aperture stop 2 toward the subject 3.

All aberrations but spherical aberrations and axial chromatic aberrations are affected by the position of an aperture stop 2; therefore, the position in which an aperture stop 2 is placed plays a key element. Coma aberrations, astigmatism, field curvatures, distortions, and magnification chromatic aberrations vary in amount depending on the position of an aperture stop 2. In the case of a lens of front-to-back symmetry, the placement of the aperture stop 2 in the vicinity of the axis of symmetry of the lens makes it possible to reduce coma aberrations and distortions (e.g., a Gauss lens). Aberrations proportional to odd powers of the angle of view, coma aberrations (raised to the first power), distortions (raised to the third power), and magnification chromatic aberrations (raised to the first power) can be eliminated by constituting a lens of symmetry and placing an aperture stop 2 in the center, because when the aperture stop 2 is so placed, an aberration having occurred in front of the aperture stop 2 is canceled in a place closer to the image surface S7 than the aperture stop 2 is. However, in the case of use of an image sensor, the aperture stop 2 is placed closer to the subject 3 because a ray of light incident upon the sensor surface needs to be perpendicular to the sensor surface and the height needs to be lowered. As for the relative positional relationship between a lens closest to the subject 3 and the aperture stop 2, it is preferable that the apex of the lens is closer to the subject 3 than the aperture stop 2 is, when the lens is of a Gauss type (whose first lens has a positive refracting power and second lens has a negative refracting power). Meanwhile, in the case of image pickup lenses configured according to the present invention (whose first lenses have a positive refracting power and second lenses have a positive refracting power), it is impossible to clearly determine from the positions of the aperture stops 2 whether the image pickup lenses are superior or inferior. Further, although image pickup modules vary in structure depending on the positions of the aperture stops 2, it is impossible to clearly determine whether the image pickup modules are superior or inferior.

Further, the present image pickup lens may be configured such that that surface of the first lens which faces the image surface has an outer portion sinking in toward the subject.

The foregoing configuration makes it possible to obtain an image pickup lens superior in wide-angle function.

Further, the present image pickup lens may be configured to further satisfy mathematical expression (4):

$$1.30 < f1/f < 3.00 \quad (4),$$

where f is the focal length of the image pickup lens as a whole and f1 is the focal length of the first lens.

The foregoing configuration makes it possible to obtain a small-size image pickup lens with spherical aberrations corrected satisfactorily.

When $f1/f$ is less than or equal to 1.30, the present image pickup lens undesirably becomes so narrower in angle of view (angle within which the image pickup lens can take an image) that the required angle of an image pickup lens to be applied to an image pickup module cannot be satisfied. When $f1/f$ is greater than or equal to 3.00, an increase in field curvatures and distortions may undesirably entail a decrease in resolving power of the image pickup lens. Therefore, in order to achieve its effects, the present image pickup lens needs to have a value of $f1/f$ that satisfies mathematical expression (4).

Further, the present image pickup lens may be configured to further satisfy mathematical expression (5):

$$1.00 < f2/f < 2.60 \quad (5),$$

where f is the focal length of the image pickup lens as a whole and f2 is the focal length of the second lens.

The foregoing configuration makes it possible to obtain a small-size image pickup lens with field curvatures corrected satisfactorily.

When $f2/f$ is less than or equal to 1.00, the second lens decreases in refracting power, whereby the permissible scope of errors are undesirably narrowed down. When $f2/f$ is greater than or equal to 2.60, the second lens increases excessively in refracting power. Moreover, it becomes necessary to increase the degree (change in shape) to which the peripheral portion of the second lens sinks in toward the image surface, and such an increase in the degree of sinking undesirably narrows down the permissible scope of errors. Therefore, in order to achieve its effects, the present image pickup lens needs to have a value of $f2/f$ that satisfies mathematical expression (5).

Further, the present image pickup lens may be configured to have an F number of 3 or less.

According to the foregoing configuration, the reduction of the F number to 3 or less allows the present image pickup lens to increase the amount of light that it receives and obtain a high resolving power because of satisfactory corrections to chromatic aberrations.

Further, the image pickup module according to the present invention may be configured such that the solid-state image sensing device has a pixel pitch of 2.5 μm or less.

According to the foregoing configuration, the constitution of the sensor with use of a solid-state image sensing device having a pixel pitch of 2.5 μm or less allows the image pickup module to make full use of the performance of the image pickup device having a large number of pixels.

Further, the image pickup module according to the present embodiment may be configured such that the second lens of the image pickup lens has an outer portion placed above the sensor via a protective member by which the sensor is protected.

According to the foregoing configuration, the image pickup module does not need to have a housing for putting the image pickup lens in. The omission of the housing allows the image pickup module to be smaller in size, lower in height, and lower in cost.

Further, both the image pickup lens and the image pickup module according to the present embodiment are configured such that at least either the first lens or the second lens is made of thermosetting resin or ultraviolet curable resin. The thermosetting resin is a resin that has a property of changing in state from a liquid to a solid under a predetermined amount of heat. The ultraviolet curable resin is a resin that has a property of changing in state from a liquid to a solid when irradiated with ultraviolet rays at a predetermined level of intensity.

The foregoing configuration makes it possible to mold a resin into a large number of lenses integrally. This makes it possible to apply a manufacturing process for batch-manufacturing a large number of image pickup lenses or modules. Therefore, both the present image pickup lens and the present image pickup module allow a reduction in cost, in particular, of mass production, and therefore can be provided inexpensively.

Further, both the image pickup lens and the image pickup module according to the present embodiment are configured such that both the first lens and the second lens are made of thermosetting resin or ultraviolet curable resin.

The foregoing configuration makes it possible to perform reflowing on the present image pickup lens and the present image pickup module. That is, an image pickup lens or module on which reflowing can be performed is required to have its first and second lenses both made of heat-resistant material. An example of applicable heat-resistant material is ultraviolet curable resin, other than thermosetting resin. Further, the foregoing configuration makes it possible, of course, to mold a resin into a large number of lenses integrally.

Further, both the methods are configured such that: the array of first lenses is produced from thermosetting resin or ultraviolet curable resin; and the array of second lenses is produced from thermosetting resin or ultraviolet curable resin.

The foregoing configuration makes it possible to manufacture an image pickup lenses or modules on which reflowing can be performed.

The present technology is not limited to the description of the embodiments above, but may be altered by a skilled person within the scope of the claims. An embodiment based on a proper combination of technical means disclosed in different embodiments is encompassed in the technical scope of the present technology.

The present embodiments can be applied to: an image pickup lens that allows a reduction in manufacturing cost and that easily maintains its desired resolving power; and an image pickup module including such an image pickup lens. As a specific example, the present invention can be used in an image pickup module, intended for mounting into a digital camera, etc. of a portable terminal, in which a solid-state image sensing device is used.

REFERENCE SIGNS LIST

1, 41, 1' Image pickup lens
2 Aperture stop
3 Subject
60, 70 Image pickup module
62 Sensor
CG Cover glass (protective member)
L1 First lens
L2 Second lens
La Optical axis
S1 Surface of the first lens which faces the subject
S2 Surface of the first lens which faces the image surface
S3 Surface of the second lens which faces the subject
S4 Surface of the second lens which faces the image surface
S7 Image surface
s1 Center of that surface of the first lens which faces the subject
s2 Center of that surface of the first lens which faces the image surface
s3 Center of that surface of the second lens which faces the subject
s4 Center of that surface of the second lens which faces the image surface
s5 Point of intersection between that surface of the second lens which faces the image surface and the optical axis
s6 Portion of the image surface which is closest to the point of intersection
d Shortest distance between that end of the image pickup lens which faces the subject and the image surface (whole length of the image pickup lens as an optical system)
d1 Length of a segment between the center that surface of the first lens which faces the subject and the center of that surface of the first lens which faces the image surface
d2 Length of a segment between the center that surface of the second lens which faces the subject and the center of that surface of the second lens which faces the image surface
d3 Length (length in air) of a segment connecting (i) the point of intersection between that surface of the second lens which faces the image surface and the optical axis with (ii) that portion of the image surface which is closest to the point of intersection
141 Thermosetting resin
144 Array of lenses (array of first lenses)
145 Array of lenses (array of second lenses)
148 Image pickup module

The invention claimed is:

1. An image pickup lens comprising:
an aperture stop;
a first lens; and
a second lens,
the aperture stop, the first lens, and the second lens being sequentially arranged along a direction from a subject to an image surface with no intervening optical elements,
the first lens having a convex surface facing the subject,
the second lens having a surface facing the subject, the surface including a central portion sticking out toward the subject and a peripheral portion surrounding the central portion and sinking in toward the image surface,
said image pickup lens satisfying mathematical expression (1):

$$0.340 < d1/d < 0.45 \qquad (1),$$

where d1 is the length of a segment between the center of that surface of the first lens which faces the subject and the center of that surface of the first lens which faces the image surface and d is the whole optical length of the image pickup lens,
the whole optical length d of the image pickup lens being a direct distance along an optical axis of the image pickup lens from the image surface to that portion of a place (A) or (B) which is closest to the subject, (A) indicating a place along the optical axis that corresponds to the location of the aperture stop, (B) indicating a place in the first lens where light enters, said image pickup lens further satisfying mathematical expression (2):

$$1.30 < f1/f < 3.00 \qquad (2),$$

where f is the focal length of the image pickup lens as a whole and f1 is the focal length of the first lens.

2. The image pickup lens as set forth in claim 1,
said image pickup lens satisfying mathematical expression (3):

$$0.10 < d2/d < 0.23 \qquad (3),$$

where d2 is the length of a segment between the center of that surface of the second lens which faces the subject and the center of that surface of the second lens which faces the image surface and d is the whole optical length of the image pickup lens.

3. The image pickup lens as set forth in claim 2,
said image pickup lens satisfying mathematical expression (4):

$$0.20 < d3/d < 0.35 \qquad (4),$$

where d3 is the length in air of a segment connecting (i) a point of intersection between that surface of the second lens which faces the image surface and an optical axis of the image pickup lens with (ii) that portion of the image surface which is closest to the point of intersection and d is the whole optical length of the image pickup lens.

4. The image pickup lens as set forth in claim 3, wherein that surface of the first lens which faces the image surface has an outer portion sinking in toward the subject.

5. The image pickup lens as set forth in claim 4, said image pickup lens further satisfying mathematical expression (5):

$$1.00 < f2/f < 2.60 \qquad (5),$$

where f is the focal length of the image pickup lens as a whole and f2 is the focal length of the second lens.

6. The image pickup lens as set forth in claim 5, said image pickup lens having an F number of 3 or less.

7. An image pickup module comprising:
a sensor constituted by using a solid-state image sensing device; and
an image pickup lens,
the image pickup lens comprising:
an aperture stop;
a first lens; and
a second lens,
the aperture stop, the first lens, and the second lens being sequentially arranged along a direction from a subject to an image surface with no intervening optical elements,
the first lens having a convex surface facing the subject, the second lens having a surface facing the subject, the surface including a central portion sticking out toward the subject and a peripheral portion surrounding the central portion and sinking in toward the image surface,
said image pickup lens satisfying mathematical expression (1):

$$0.340 < d1/d < 0.45 \quad (1),$$

where d1 is the length of a segment between the center of that surface of the first lens which faces the subject and the center of that surface of the first lens which faces the image surface and d is the whole optical length of the image pickup lens,
the whole optical length d of the image pickup lens being a direct distance along an optical axis of the image pickup lens from the image surface to that portion of a place (A) or (B) which is closest to the subject, (A) indicating a place along the optical axis that corresponds to the location of the aperture stop, (B) indicating a place in the first lens where light enters, said image pickup lens further satisfying mathematical expression (2):

$$1.30 < f1/f < 3.00 \quad (2),$$

where f is the focal length of the image pickup lens as a whole and f1 is the focal length of the first lens.

8. The image pickup module as set forth in claim 7, said image pickup lens satisfying mathematical expression (3):

$$0.10 < d2/d < 0.23 \quad (3),$$

where d2 is the length of a segment between the center of that surface of the second lens which faces the subject and the center of that surface of the second lens which faces the image surface and d is the whole optical length of the image pickup lens.

9. The image pickup module as set forth in claim 8, said image pickup lens satisfying mathematical expression (4):

$$0.20 < d3/d < 0.35 \quad (4),$$

where d3 is the length in air of a segment connecting (i) a point of intersection between that surface of the second lens which faces the image surface and an optical axis of the image pickup lens with (ii) that portion of the image surface which is closest to the point of intersection and d is the whole optical length of the image pickup lens.

10. The image pickup lens as set forth in claim 6, wherein at least either the first lens or the second lens is made of thermosetting resin or ultraviolet curable resin.

11. The image pickup module as set forth in claim 9, wherein both the first lens and the second lens are made of thermosetting resin or ultraviolet curable resin.

* * * * *